US010409827B2

(12) United States Patent
Kheterpal et al.

(10) Patent No.: US 10,409,827 B2
(45) Date of Patent: Sep. 10, 2019

(54) DIGITAL CURRENCY MINING CIRCUITRY HAVING SHARED PROCESSING LOGIC

(71) Applicant: 21, Inc., San Francisco, CA (US)

(72) Inventors: Veerbhan Kheterpal, Santa Clara, CA (US); Daniel Firu, San Jose, CA (US); Nigel Drego, San Francisco, CA (US)

(73) Assignee: 21, Inc., San Francisco, CA (US)

( * ) Notice: Subject to any disclaimer, the term of this patent is extended or adjusted under 35 U.S.C. 154(b) by 676 days.

(21) Appl. No.: 14/866,102

(22) Filed: Sep. 25, 2015

(65) Prior Publication Data

US 2016/0125040 A1  May 5, 2016

Related U.S. Application Data

(60) Provisional application No. 62/073,522, filed on Oct. 31, 2014.

(51) Int. Cl.
*G06F 16/2458* (2019.01)
*G06Q 20/06* (2012.01)
(Continued)

(52) U.S. Cl.
CPC ........ *G06F 16/2465* (2019.01); *G06F 16/951* (2019.01); *G06Q 20/06* (2013.01);
(Continued)

(58) Field of Classification Search
CPC ........ G06F 17/30539; G06F 17/30864; G06Q 20/06; G06Q 20/3678; G06Q 20/3827;
(Continued)

(56) References Cited

U.S. PATENT DOCUMENTS 6,446,216 B1 * 9/2002 Shelley ............... G06F 7/00
713/324
6,829,355 B2 * 12/2004 Lilly ............... H04L 9/0643
380/255

(Continued)

FOREIGN PATENT DOCUMENTS

WO  2015077378  5/2015

OTHER PUBLICATIONS

Tucket et al., "Interactive Demonstration: This Is How You Mine Some Bitcoin," Bloomberg Businessweek, Jan. 13, 2014 [Retrieved on Apr. 14, 2014]. Retrieved from the Internet <URL: http://http://www.businessweek.com/printer/articles/1 85845-interactive-demonstration-this-is-how-you-mine-some-bitcoin>.
(Continued)

*Primary Examiner* — Sharon S Lynch
(74) *Attorney, Agent, or Firm* — Jeffrey Schox; Diana Lin

(57) ABSTRACT

An integrated circuit may be provided with cryptocurrency mining capabilities. The integrated circuit may include control circuitry and a number of processing cores that complete a Secure Hash Algorithm 256 (SHA-256) function in parallel. Logic circuitry may be shared between multiple processing cores. Each processing core may perform sequential rounds of cryptographic hashing operations based on a hash input and message word inputs. The control circuitry may control the processing cores to complete the SHA-256 function over different search spaces. The shared logic circuitry may perform a subset of the sequential rounds for multiple processing cores. If desired, the shared logic circuitry may generate message word inputs for some of the sequential rounds across multiple processing cores. By sharing logic circuitry across cores, chip area consumption and power efficiency may be improved relative to scenarios where the cores are formed using only dedicated logic.

16 Claims, 13 Drawing Sheets

(51) Int. Cl.
*G06F 16/951* (2019.01)
*G06Q 20/36* (2012.01)
*G06Q 20/38* (2012.01)
*G06Q 40/04* (2012.01)
*H04L 9/06* (2006.01)
*H04L 9/32* (2006.01)

(52) U.S. Cl.
CPC ..... *G06Q 20/3678* (2013.01); *G06Q 20/3827* (2013.01); *G06Q 40/04* (2013.01); *H04L 9/0643* (2013.01); *H04L 9/3236* (2013.01); *H04L 2209/30* (2013.01); *H04L 2209/38* (2013.01)

(58) Field of Classification Search
CPC ..... G06Q 40/04; H04L 9/0637; H04L 9/0643; H04L 2209/38
See application file for complete search history.

(56) References Cited

U.S. PATENT DOCUMENTS

| | | | |
|---|---|---|---|
| 7,142,669 B2 | 11/2006 | Dworkin et al. | |
| 7,249,255 B2 | 7/2007 | Anand | |
| 7,584,441 B2 | 9/2009 | Gidon et al. | |
| 7,684,563 B1 | 3/2010 | Olson et al. | |
| 7,757,187 B2 | 7/2010 | Kheterpal et al. | |
| 7,783,691 B2 | 8/2010 | Liardet et al. | |
| 8,135,960 B2 | 3/2012 | Koehler et al. | |
| 8,174,329 B2 | 5/2012 | Goodnow et al. | |
| 8,832,450 B2 | 9/2014 | Ciet et al. | |
| 9,495,668 B1* | 11/2016 | Juels | G06Q 20/06 |
| 2002/0122554 A1* | 9/2002 | Lilly | H04L 9/0643 380/28 |
| 2006/0136531 A1* | 6/2006 | Ng | G06F 7/74 708/100 |
| 2008/0104552 A1 | 5/2008 | Yamada | |
| 2009/0083263 A1* | 3/2009 | Felch | G06F 9/3851 |
| 2010/0318947 A1* | 12/2010 | Motiani | G06F 17/5045 716/104 |
| 2011/0050281 A1* | 3/2011 | Moe | G06F 17/5045 326/38 |
| 2013/0065669 A1* | 3/2013 | Michaelson | G07F 17/3225 463/25 |
| 2013/0065670 A1* | 3/2013 | Michaelson | G07F 17/3244 463/25 |
| 2014/0093069 A1* | 4/2014 | Wolrich | G09C 1/00 380/28 |
| 2015/0170112 A1* | 6/2015 | DeCastro | G06Q 20/381 705/39 |
| 2015/0294308 A1* | 10/2015 | Pauker | G06Q 20/3827 705/67 |
| 2015/0356555 A1* | 12/2015 | Pennanen | G06Q 20/06 705/71 |
| 2016/0027229 A1* | 1/2016 | Spanos | G07C 13/00 705/51 |
| 2016/0086175 A1* | 3/2016 | Finlow-Bates | H04L 9/3271 705/77 |
| 2016/0112200 A1* | 4/2016 | Kheterpal | H04L 9/0643 380/28 |
| 2017/0187535 A1* | 6/2017 | Middleton | H04L 9/3247 |

OTHER PUBLICATIONS

Berke et al. "Bitcoin Demystified: A Hacker's Perspective," HuffPost Code, Nov. 25, 2013 [Retrieved on Apr. 14, 2014]. Retrieved from the Internet <URL: http://www.huffingtonpost.com/201 3/11 /25/ bitcoin-basics-explainedn4340141 .html?view=print&comm_ref= false>.
"Mining," Bitcoin Wiki, Apr. 1, 2014 [Retrieved on Apr. 14, 2014]. Retrieved from the Internet <URL:https://en.bitcoin.it/wiki/Mining>.
Nakamoto, "Bitcoin: a Peer-to-Peer Electronic Cash System," www.bitcoio.org [Retrieved on Apr. 14, 2014]. Retrieved from the Internet <URL:https:Hbitcoin.org/bitcoin.pdf>.
"Block," Bitcoin Wiki, Mar. 2, 2014 [Retrieved on Apr. 14, 2014]. Retrieved from the Internet <URL:https://en.bitcoin.itlwiki/Block>.
"Descriptions of SHA-256, SHA-384, and SHA-512", 50 pages, Retrieved from the Internet on Sep. 25, 2015, URL: <http://iwar.org.uk/comsec/resources/cipher/sha256-384-512.pdf>.
Kheterpal et al., U.S. Appl. No. 14/738,659, filed Jun. 12, 2015.
Taylor, "Bitcoin and the age of bespoke silicon", Proceedings of the 2013 International Conference on Compilers, Architectures and Syntheses for Embedded Systems, Sep. 29, 2013 (Sep. 29, 2013, pp. 1-10, XP055232879, DOI: 10.1109/CASES.2013.6662520, ISBN: 978-1-4799-1400-5, pp. 3-6.
Dotemoto, "FPGA Based Ditcoin Mining", Jun. 10, 2014 (Jun. 10, 2014), XP055233050, San Luis Obispo, USA Retrieved from the Internet: URL:http://digitalcommons.calpoly.edu/cgi/viewcontent.cgi?article=1285&context=eesp [retrieved on Dec. 2, 2015] pp. 16,17; figure 5.
Naik et al., "Optimising the SHA256 Hashing Algorithm for Faster and More Efficient Bitcoin Mining", Sep. 2, 2013 (Sep. 2, 2013), XP055233141, Retrieved from the Internet: URL:http://nicolascourtois.com/bitcoin/Optimising%20the%20and%20Hashing%20Algorithm%20Faster%20and%20More%20Efficient%20Bitcoin%20Mining_Rahul_Naik.pdf [retrieved on Dec. 5, 2015] pp. 25, 26; figure 5.

* cited by examiner

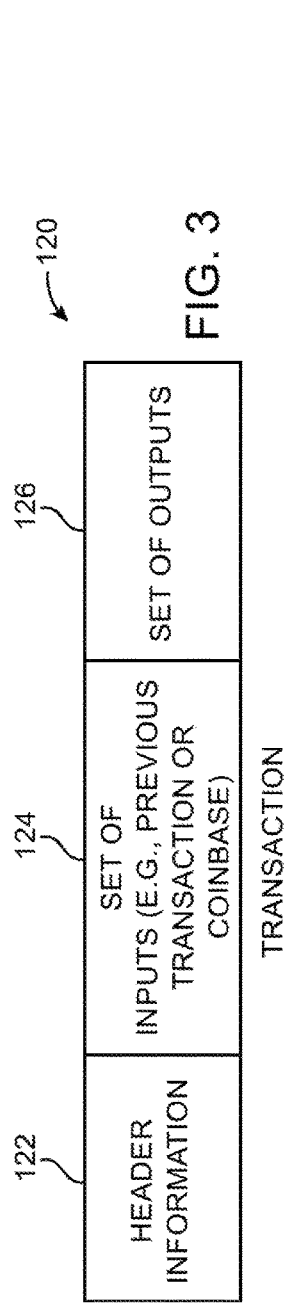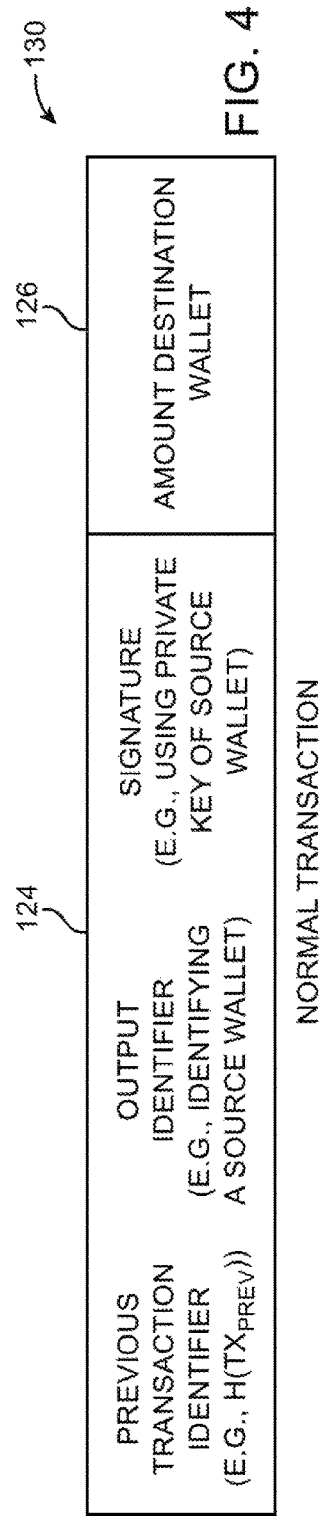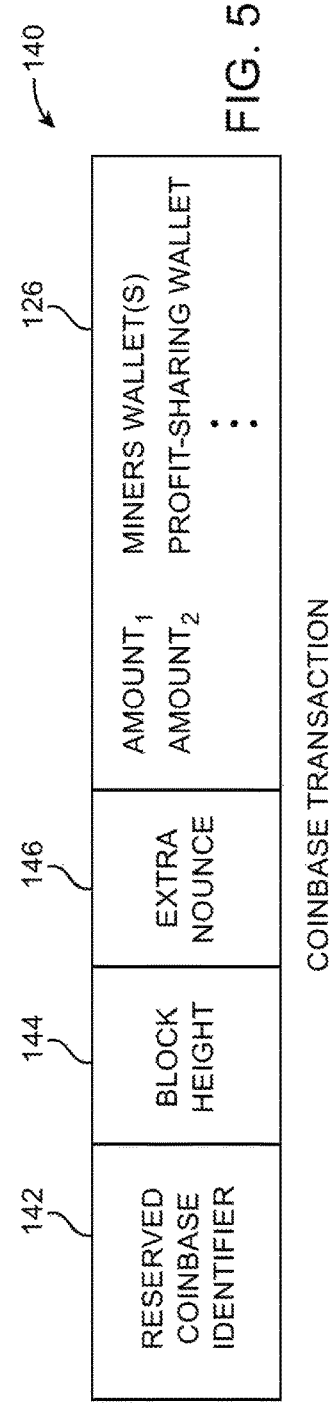

DIGITAL CURRENCY MINING CIRCUITRY HAVING SHARED PROCESSING LOGIC

This application claims the benefit of provisional patent application No. 62/073,522, filed Oct. 31, 2014, which is hereby incorporated by reference herein in its entirety.

BACKGROUND

This relates to digital currencies, and more particularly, to mining digital currencies.

Digital currencies serve as a digital medium of exchange in which the digital currencies may be transferred in exchange for goods and services. Crypto-currencies are examples of digital currencies in which cryptography governs the creation and exchange of value. An example of a cryptocurrency is the bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network. The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Verified transactions and newly created bitcoins are recorded in the public ledger. The public ledger serves as an official history of transactions. The amount of cryptocurrency owned by any entity may be determined from the public ledger.

Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). The difficulty of the cryptographic puzzle has led to the use of dedicated circuitry designed specifically for Bitcoin mining. Such dedicated circuitry can be expensive to design, purchase, and operate.

SUMMARY OF THE INVENTION

An integrated circuit may be provided with cryptocurrency mining capabilities. The integrated circuit may include processing circuitry that mines digital cryptocurrency by completing a cryptographic function according to a protocol that governs the digital cryptocurrency. The integrated circuit may include control circuitry and a number of processing cores that complete the cryptographic function in parallel. As an example, the control circuitry may control the processing cores to complete a Secure Hash Algorithm 256 (SHA-256) function in parallel for generating Bitcoin rewards based on a Bitcoin protocol.

The integrated circuit may, for example, include first, second, and third processing cores. Shared logic circuitry may be shared between each of the first, second, and third processing cores. The shared logic circuitry may be formed on a region of the integrated circuit occupied by the first, second, and/or third processing cores. The control circuitry may provide control signals to the shared logic circuitry to control the first, second, and third processing cores to complete the cryptographic function in parallel. The control circuitry may control the processing cores to complete the cryptographic function over respective first, second, and third different search spaces. The shared logic circuitry may, if desired, complete a portion of the cryptographic function corresponding to an overlap between the search spaces.

The first processing core may, for example, include a first cryptographic hashing circuit whereas the second processing core includes a second cryptographic hashing circuit and the third processing core includes a third cryptographic hashing circuit. Each of the hashing circuits may include a sequence of rounds of cryptographic hashing logic that performs a cryptographic hashing algorithm based on an initial hash value received from the control circuitry and message input words received from message scheduling circuitry. The shared logic circuitry may perform a subset of the sequential rounds (e.g., one or more leading rounds) of the cryptographic hashing algorithm for at least the first, second, and third processing cores.

Message scheduling circuitry may receive different respective messages for each of the processing cores from the control circuitry. The message scheduling circuitry may generate the message input words based on the received messages. In accordance with any of the above arrangements, the shared logic circuitry may form a portion of the message scheduling circuitry. The shared logic circuitry may generate a selected message input word based on first, second, and third messages received for the first, second, and third processing cores respectively. The shared logic circuitry may provide the selected message input word to each of the first, second, and third processing cores. The first, second, and third processing cores may perform at least one of the sequential rounds of the cryptographic hashing algorithm based on the selected message input word.

If desired, partially shared logic circuitry may be shared by the first and second processing cores but not the third processing core. An input of the partially shared logic circuitry may be coupled to an output of the shared logic circuitry. The partially shared logic circuitry may generate an additional message word based on the first and second messages and may provide the additional message word to the first and second processing cores (e.g., without providing the additional message word to the third core) for performing at least one of the sequential rounds of the cryptographic hashing algorithm (e.g., rounds that are subsequent to those performed using the selected message word generated by the shared logic circuitry). If desired, unshared logic circuitry may be formed on the first processing core but not on the second and third processing cores. An input of the unshared logic circuitry may be coupled to an output of the partially shared logic circuitry and the unshared logic circuitry may be configured to generate a message word for at least one of the sequential rounds of the first processing core.

The first processing core may generate a first hash output value based on at least one of the message word generated by the unshared logic circuitry. The hash output value may be combined with an initial hash value at adder circuitry to generate a final hash value. The final hash value may be provided to data padding circuitry or difficulty comparison circuitry for further processing.

In accordance with any of the above arrangements, a first round of cryptographic hashing circuitry may be implemented on a given processing core and may generate a first hash value based on an input value and a first message word received from message scheduling circuitry. A second round of cryptographic hashing circuitry that is implemented on two different processing cores may receive the first hash value from the first round of cryptographic hashing circuitry and may generate second and third hash values based on the first hash value and a second message word. A final round of cryptographic hashing circuitry may generate a first hash output value based at least partly on the second hash value and a third message word and may generate a second hash output value based at least partly on the third hash value and the third message word. For example, a number of intermediate sequential rounds of cryptographic hashing circuitry may be interposed between the second round and the final round. By sharing logic circuitry among the processing cores, chip area consumption and power efficiency may be improved relative to scenarios where the processing cores are formed using only dedicated logic.

Further features will be more apparent from the accompanying drawings and the following detailed description.

BRIEF DESCRIPTION OF THE DRAWINGS

FIG. 3 is an illustrative transaction of digital currency that may be verified using mining circuitry in accordance with an embodiment of the present invention.

FIG. 4 is an illustrative transaction of digital currency between source and destination wallets that may be verified using cryptographic hashing circuitry running on mining circuitry in accordance with an embodiment of the present invention.

FIG. 5 is an illustrative coinbase transaction in which a portion of a reward amount is assigned to different wallets in accordance with an embodiment of the present invention.

DETAILED DESCRIPTION

The present invention relates to mining of digital currencies such as crypto-currencies. Mining circuitry and mining operations described herein may be used for any digital medium of exchange such as digital currencies, credits, rewards, or points.

Figure 1:
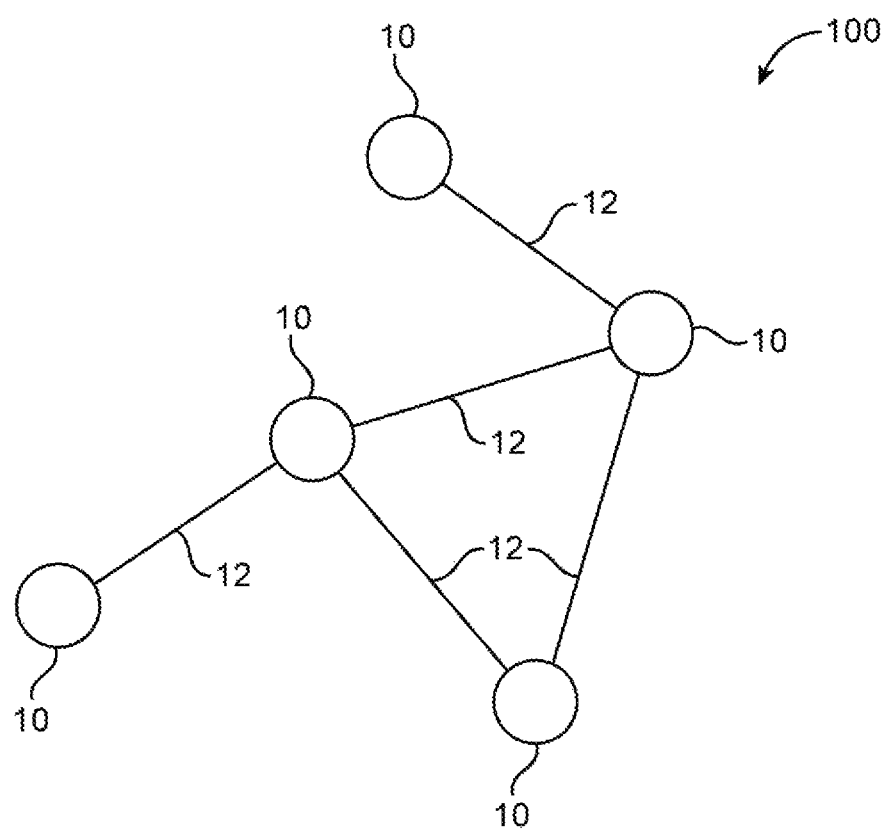
FIG. 1 is an illustrative diagram of a network of nodes having cryptographic hashing circuitry that may be used to mine digital currency in accordance with an embodiment of the present invention.

FIG. 1 is an illustrative diagram of a peer-to-peer network 100 that may operate according to the Bitcoin protocol. Network 100 includes nodes 10 that are coupled to other nodes via paths 12. Nodes 10 may be electronic devices such as desktop computers, laptop computers, cellular telephones, servers, or other electronic devices that implement the Bitcoin protocol. Each node 10 may communicate with other nodes of network 100 over paths 12. Paths 12 may, for example, include network paths such as network cables and packet forwarding devices (e.g., switches, routers, etc.) that couple nodes 10 to other nodes. This example is merely illustrative. Nodes 10 of network 100 may be coupled via any desired underlying communications technology such as wired or wireless network technologies and network 100 may include any desired number of nodes (e.g., tens, hundreds, thousands, millions, or more).

Nodes 10 may communicate over paths 12 according to the Bitcoin protocol in maintaining the cryptocurrency. For example, nodes 10 may communicate to maintain a global ledger of all official transactions. Each node 10 may store a copy of the global ledger (e.g., a complete copy or only a partial copy). Transactions added to the global ledger by each node 10 may be verified by other nodes 10 to help ensure validity of the ledger.

Figure 2:
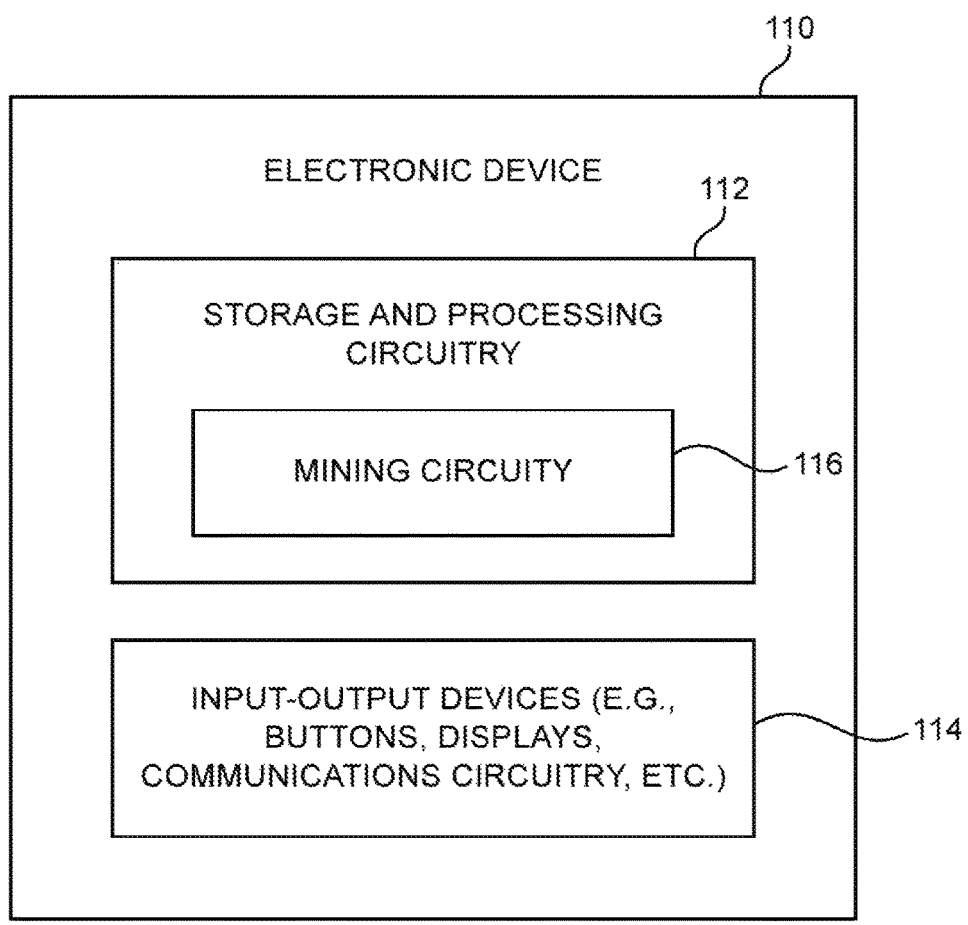
FIG. 2 is an illustrative diagram of an electronic device that may include cryptographic hashing circuitry in accordance with an embodiment of the present invention.

FIG. 2 is an illustrative diagram of an electronic device 110 that may serve as a node in a peer-to-peer network (e.g., as a node 10 of FIG. 1). As shown in FIG. 2, device 110 may include storage and processing circuitry 112. Storage and processing circuitry 112 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 112 may be used to control the operation of device 110. This processing circuitry may be based on one or more general purpose processing circuits such as microprocessors, microcontrollers, and digital signal processors, or dedicated processing circuits such as application specific integrated circuits, etc.

Device 110 may be provided with input-output devices 114 such as buttons, speakers, microphones, displays, and other input-output devices that accommodate user interaction with device 110. Input-output devices 114 may include communications circuitry for communicating with other devices (e.g., other nodes of a cryptocurrency network). Mining circuitry 116 may perform mining operations such as verifying cryptocurrency transactions (e.g., while sharing any rewards or the mining operations between multiple entities such as a user of the device). Mining circuitry 116 may record the rewards in the global ledger. Mining circuitry 116 may, for example, be an integrated circuit chip. Electronic device 110 may include one or more of these chips that may be operated together or independently.

Electronic device 110 may be a desktop computer, a server in a rack-based system, a portable electronic device such as a tablet computer, laptop computer, or a cellular telephone. These examples are merely illustrative. Mining circuitry 116 may be provided to any desired electronic device that can communicate with other nodes of a cryptocurrency network. For example, a flash drive that connects with a computer may be provided with mining circuitry 116. In this scenario, the mining circuitry 116 may operate to perform mining operations by utilizing computer resources when the flash drive is connected to a computer (e.g., by utilizing power from the computer and a network connection between the computer and nodes of a cryptocurrency network).

FIG. 3 is a diagram of an illustrative cryptocurrency transaction 120 that may be verified using mining circuitry such as circuitry 116 of FIG. 2. As shown in FIG. 3, transaction 120 may include header information 122, a set of one or more inputs 124, and a set of one or more outputs 126.

Header information 122 may include one or more header fields including information that helps to identify the transaction. For example, the header fields may include a version number identifying the version of the Bitcoin protocol that is used. As another example, the header fields may include a current timestamp and/or other information on the transaction.

Digital currency may be stored in digital wallets that serve as sources or destinations of transactions. For example, a transaction may transfer funds from a source wallet to a destination wallet. Digital wallets may be formed using any desired data structure and may sometimes be referred to as digital accounts. Wallets may be identified using encryption schemes such as public-key cryptography in which a public-private key pair is assigned to each wallet. The public key of a wallet may serve to publicly identify the wallet (e.g., a public address to which funds may be directed), whereas the private key may be used by the owner of the wallet to sign transactions (e.g., thereby verifying the authenticity of the transactions).

Transaction 120 may identify an input 124 (e.g., a source of funds) and a set of outputs 126 (e.g., destinations). The inputs and outputs may, for example, be digital wallets in which currency is stored. The inputs may refer to an output of a previous transaction as a source of funding or may identify that transaction 120 is an originating transaction that creates new currency (sometimes referred to as a coinbase transaction).

FIG. 4 is a diagram of an illustrative transaction 130 that transfers currency from a source wallet to a destination wallet. Transaction 130 may be, for example, a data packet or sequence (stream) of data packets having corresponding header fields 124 and 126. As shown in FIG. 4, input 124 may include a previous transaction identifier, an output identifier, and a signature. If desired, header information 122 of FIG. 3 such as version number or timestamp information may be included in the transaction of FIG. 5.

The previous transaction identifier may identify which transaction of the global ledger contains the source wallet. The previous transaction identifier may, if desired, identify the previous transaction TXPREV by a hash (e.g., H(TXPREV)) or double-hash (e.g., H(H(TXPREV)) or DH(TXPREV)) of the previous transaction. The output identifier may identify which output of the identified previous transaction serves as the source wallet of transaction 130. For example, the outputs 126 of the previous transaction may be enumerated and the index of the source wallet may serve as the output identifier.

Transaction 130 may be signed to help ensure authenticity of the transaction. For example, the private key of the source wallet may be used to encrypt transaction 130 or a portion of transaction 130 to generate the signature that is stored in transaction 130. The public key of the source wallet may be used by others (e.g., other network nodes) to decrypt the signature and confirm the authenticity of the transaction.

The set of outputs 126 identifies one or more destination wallets and a respective amount to transfer from the source wallet to each destination wallet. In the example of FIG. 4, the transaction includes one destination wallet and a corresponding amount to be transferred from the source wallet to the destination wallet. Multiple destination wallets (e.g., two, three, four, or more) may be listed along with corresponding amounts to be transferred to each destination wallet from the source wallet. If desired, the source wallet identified by input 124 may also be listed as a destination wallet. For example, the amount to be transferred to the destination wallet may be less than the amount identified by the output of the previous transaction as belonging to the source wallet. In this scenario, the difference between the amount of the source wallet and the transfer amount may be assigned to the source wallet as an additional output entry. If desired, the amount assigned in outputs 126 to the source wallet may be less than the difference between the originally stored amount and the transfer amount. In this scenario, the difference between original source amount and the sum of amounts in output 126 may serve as additional reward for any miner that verifies the transaction (e.g., in addition to any predetermined reward defined by the cryptocurrency protocol).

FIG. 5 is an illustrative diagram of an originating transaction (i.e., coinbase transaction) that may generate new digital currency. As shown in FIG. 5, transaction 140 includes information that identifies the transaction as a coinbase transaction. The information may include a reserved coinbase identifier 142, a block height 144, and an extra-nonce value 146. If desired, header information 122 of FIG. 3 such as version number or timestamp information may be included in the transaction of FIG. 5.

Reserved coinbase identifier 142 may be a value that is reserved for coinbase transactions. Block height 144 may help identify where the coinbase transaction is located within the global ledger (e.g., which block of a block chain that represents the global ledger). Extra-nonce value 146 is an arbitrary value that may be modified during mining operations.

In contrast to normal transactions such as transaction 130 of FIG. 4, coinbase transaction 140 does not provide a source of funds for outputs 126. Instead, coinbase transaction 140 may create new currency. The amount of new currency created is determined by the cryptocurrency protocol. For example, nodes of the cryptocurrency network may communicate and establish an agreed-upon reward that is created for verifying transactions. The agreed-upon reward may be determined based on the size of the global ledger (e.g., how many recorded blocks are in the global ledger). As an example, the reward for verifying and recording transactions in the Bitcoin protocol may reward a number of bitcoins (units of currency) such as 25 bitcoins. This example is merely illustrative, as the number of bitcoins rewarded may be less than 25 (e.g., 12.5, 6.25, etc.) or may even be zero.

In some scenarios, transactions that are verified using mining circuitry may include fees. For example, transaction 130 of FIG. 4 may assign fewer bitcoins to destination wallets than contained in the source wallet. In this scenario, the remainder may serve as fees (e.g., an additional reward) for a miner. This additional reward may be assigned to the miner's wallet in coinbase transaction 140 or may also be partitioned by the mining circuitry between the miner's wallets and other wallets (e.g., profit-sharing wallets).

Figure 6:
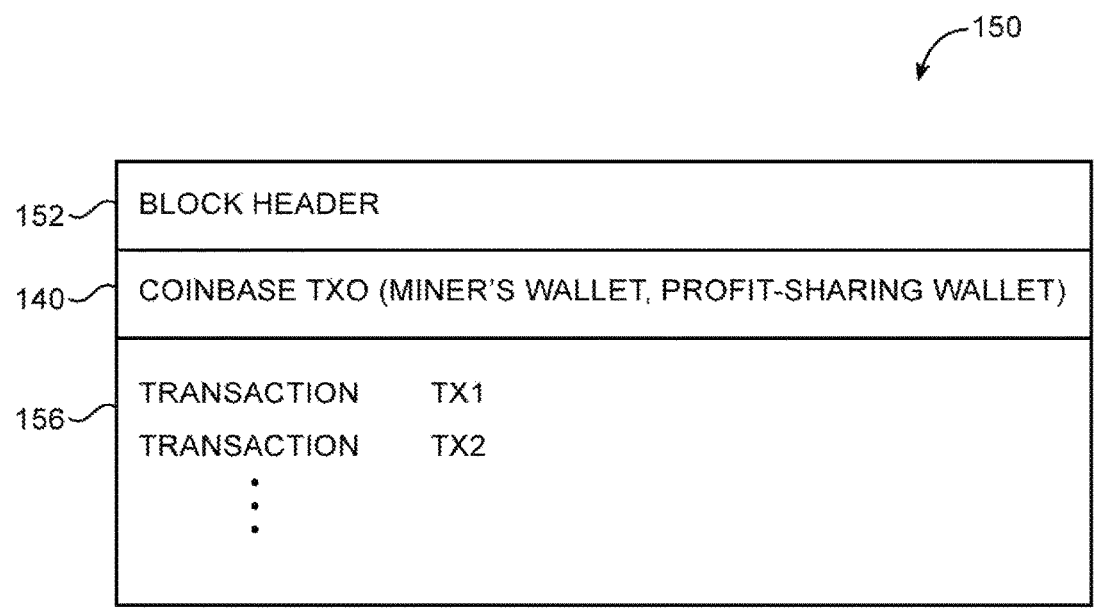
FIG. 6 is an illustrative block that may be generated by mining circuitry and recorded in a global ledger in accordance with an embodiment of the present invention.

In performing mining operations to verify and record a set of transactions, mining circuitry may generate a block to be recorded in the global ledger as shown in FIG. 6. Block 150 of FIG. 6 may include block header 152, coinbase transaction TX0 (e.g., a coinbase transaction 140), and a set of transactions 156 to be recorded.

Figure 7:
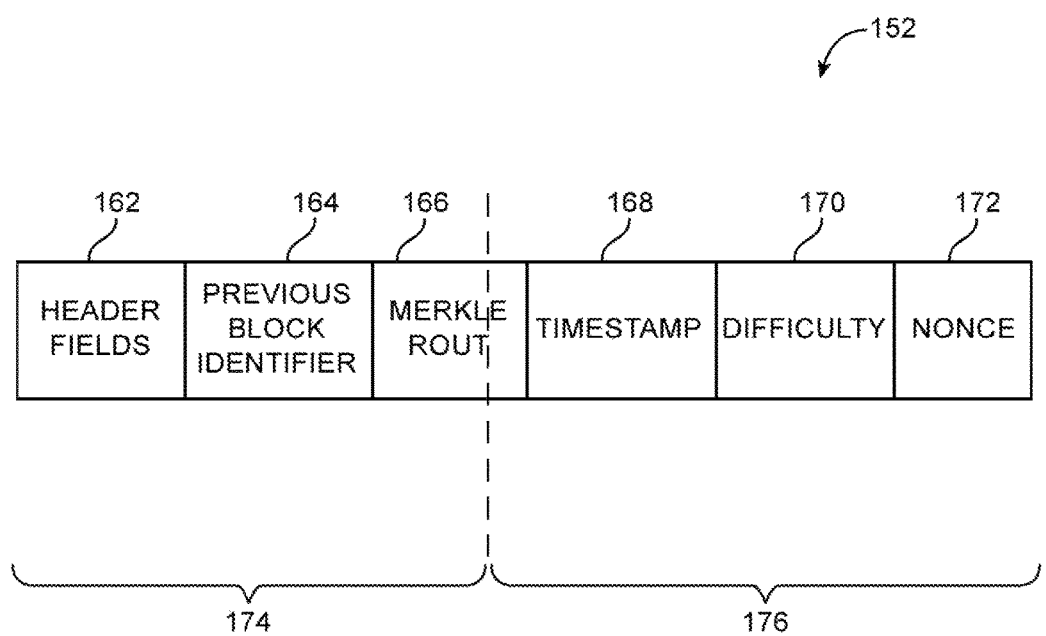
FIG. 7 is an illustrative block header that may be generated by mining circuitry in solving a cryptographic puzzle in accordance with an embodiment of the present invention.

Block header 152 may include information that identifies block 150 and additional information generated by the mining circuitry to complete a function such as information satisfying a cryptographic puzzle. The additional information may be generated to solve the function (e.g., puzzle) for a given set of function inputs that are at least partially determined by block header 152 and for a desired output or range of outputs. FIG. 7 is a diagram of an illustrative block header 152. As shown in FIG. 7, block header 152 may include header fields 162, a previous block identifier 164, a Merkle root 166, a timestamp 168, a difficulty value 170, and a nonce value 172.

Header fields 162 may include any desired header fields such as a version number of the Bitcoin protocol. Previous block identifier 164 may identify a previous block in the global ledger (e.g., the global ledger may be a chain of blocks 152 in which each block references a previous block in the chain). For example, the previous block identifier may be a hash of the block header of the previous block.

Merkle root 166 may be generated from the transactions of block 150 including coinbase transaction 140 and the set of transactions 156. Merkle root 166 may provide a compact representation of the transactions in block 150. For example, Merkle root 166 may be a 256-bit (32 Byte) value, whereas the transactions of block 150 may be hundreds, thousands, or millions of bytes.

Difficulty value 170 is a parameter of the function (e.g., cryptographic puzzle) that is solved with block 150. For the Bitcoin protocol, the cryptographic puzzle involves generating block header 152 such that the hash of block header 152 is less than a predetermined value. The hash may be calculated using a protocol-determined hash function such as the Secure Hash Algorithm (SHA). The predetermined value may depend on difficulty value 170. For example, difficulty value 170 may specify how many leading zeros in a binary data representation are required in the hashed block header value.

Mining circuitry 116 may adjust one or more of the fields in block header 152 in order to provide block header 152 with a hash value that solves the cryptographic puzzle (e.g., a sufficiently small hash value). For example, the mining circuitry may adjust the nonce value or the timestamp value.

As another example, the mining circuitry may adjust the extra-nonce value in the coinbase transaction of the block, which indirectly adjusts the Merkle root. Mining circuitry 116 may perform exhaustive search by iterating over all possible solutions to the cryptographic puzzle.

Hash functions used by the cryptographic puzzle may operate in sequential steps (sometimes referred to herein as stages) on block header 152. If desired, a first portion 174 of block header 152 may be processed in a first hashing stage, whereas a second portion 176 of block header 152 may be processed in a second, subsequent hashing stage. Each hashing stage may involve a number of so-called rounds of logical operations. Each round of logical operations may involve the same logical functions (e.g., operating on different inputs for each round). For example, the output of a given round of logical operations in the hashing function may serve as an input for a subsequent round of the logical operations. The logical operations may iteratively be performed in this way to produce an output of the hashing function. For example, when a Secure Hashing Algorithm (SHA) 256 function is used, second portion 176 of block header 152 may be operated on by 64 rounds of SHA-256 before producing a hash output (e.g., an initial input to logical circuitry implementing the SHA-256 hashing algorithm may be operated on by the logic circuitry and provided as an input to a subsequent round of logic circuitry identical to the previous round of logical circuitry, and so on until the desired number of rounds of logic functions have been performed). This example is merely illustrative. The number of rounds of hashing may depend on the hashing algorithm performed by mining circuitry 116.

Portion 174 may include header fields 162, previous block identifier 164, and a first portion of Merkle root 166, whereas portion 176 may include a second portion of Merkle root 166, timestamp 168, difficulty value 170, and nonce value 172. The SHA function may produce an output value for the first stage based on portion 174 of block header 152. The output value of the first stage may serve as an input to the second stage of the SHA function along with portion 176 of block header 152. The second stage of the SHA function may produce the hash value of block header 152. The SHA function may be implemented using dedicated hardware circuitry on mining circuitry 116.

Figure 8:
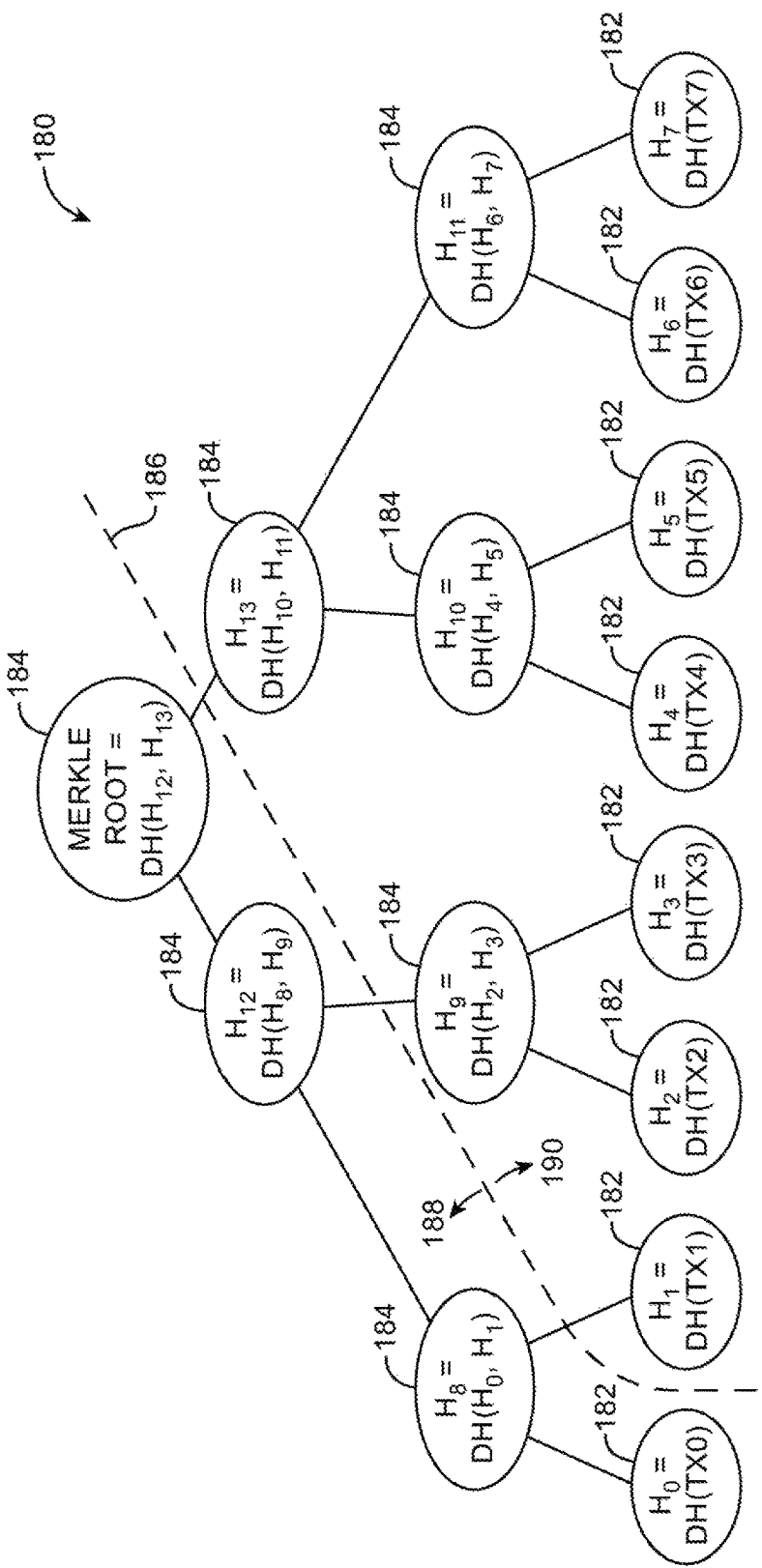
FIG. 8 is an illustrative Merkle tree that may be calculated by mining circuitry from a set of transactions in solving a cryptographic puzzle in accordance with an embodiment of the present invention.

Merkle root 166 may be computed by generating a Merkle tree from the transactions of the corresponding block 150. FIG. 8 is a diagram of an illustrative Merkle tree 180 generated from a block including transactions TX0, TX1, TX2, TX3, TX4, TX5, TX6, and TX7. The example of FIG. 8 in which the block includes eight transactions is merely illustrative. A Merkle tree may be computed from any binary number of transactions (e.g., 2, 4, 6, 8, etc.). If a block does not contain a binary number of transactions, placeholder transactions may be added to complete the Merkle tree. Such placeholder transactions are used only in generating the Merkle tree and are not added to the block.

As shown in FIG. 8, Merkle tree 180 includes leaf nodes 182 that are each generated by computing the double hash of a respective transaction (e.g., using the SHA function). For example, hash value H0 is computed from the (double) hash (DH) of transaction TX0 (e.g., a coinbase transaction), whereas hash values H1, H2, H3, H4, H5, H6, and H7 are computed from transactions TX1, TX2, TX3, TX4, TX5, TX6, and TX7, respectively. Double hash operations may involve performing a cryptographic hashing function H(Z) on an input Z to generate an output Y and performing the same cryptographic hashing function H on the output Y of the first cryptographic hashing function to generate a double hashed output X (e.g., X=H(H(Z))), for example.

Merkle tree 180 may be organized as a binary tree in which each non-leaf node 184 has two child nodes. The nodes of each successive level of the tree may be computed by hashing nodes of a lower (previous) level. The second level of the tree (e.g., the nodes storing hash values H8, H9, H10, and H11) may be generated by double hashing the values stored in leaf nodes 182. For example, hash value H8 is generated by concatenating leaf values H0 and H1 and double hashing the concatenated result. Similarly, the third level of the tree may be generated by hashing the values of the second level (e.g., hash value H12 may be calculated by hashing the concatenation of H8 and H9, whereas hash value H13 may be calculated by hashing the concatenation of H10 and H11). The number of levels in the tree may depend on the number of transactions in the block. In the example of FIG. 8, the root of Merkle tree 180 is at the fourth level and is calculated from hashing values H12 and H13.

The hashed value at each node of Merkle tree 180 has a fixed, predetermined size (e.g., 256 bits), and is dependent on the values at the children of that node. The Merkle root therefore serves as a compact representation of all of the transactions in the corresponding block, because any changes to a transaction percolate upwards to the Merkle root. For example, changes to coinbase transaction TX0 causes hash value H8 to change, which modifies hash value H12, which then modifies the Merkle root value. Similarly, changes to any of the transactions result in changes to the Merkle root value.

Mining circuitry 116 may generate some or all of Merkle tree 180 while searching for solutions to a cryptographic puzzle. For example, in iterating through extra-nonce values in a coinbase transaction TX0, the mining circuitry may need to re-compute the Merkle root for each new extra-nonce value. To help reduce computation time and improve performance, the mining circuitry may re-compute only a portion of Merkle tree 180 during each iteration. In particular, changes to coinbase transaction TX0 only affect hash values H0, H8, H12, and the Merkle root, whereas the remaining nodes of the Merkle tree are unchanged. Dotted line 186 represents the edge of the Merkle tree that separates hash values that need to be recomputed and hash values that remain unchanged when modifying coinbase transaction TX0. Nodes to the left of edge 186 need to be recomputed (portion 188 of tree 180), whereas nodes to the right of edge 186 do not need to be recomputed (portion 190 of tree 180). The mining circuitry can store the constant nodes at edge 186 and reuse the stored values to re-compute the Merkle root. In the example of FIG. 8, hash values H1, H9, and H13 may be stored, whereas the remaining hash values of tree portion 190 do not need to be stored. If desired, nodes to the left of edge 186 may be computed off-chip by circuitry external to mining circuitry 116 (e.g., to save processing time, power, and chip area on mining circuitry 116).

Figure 9:
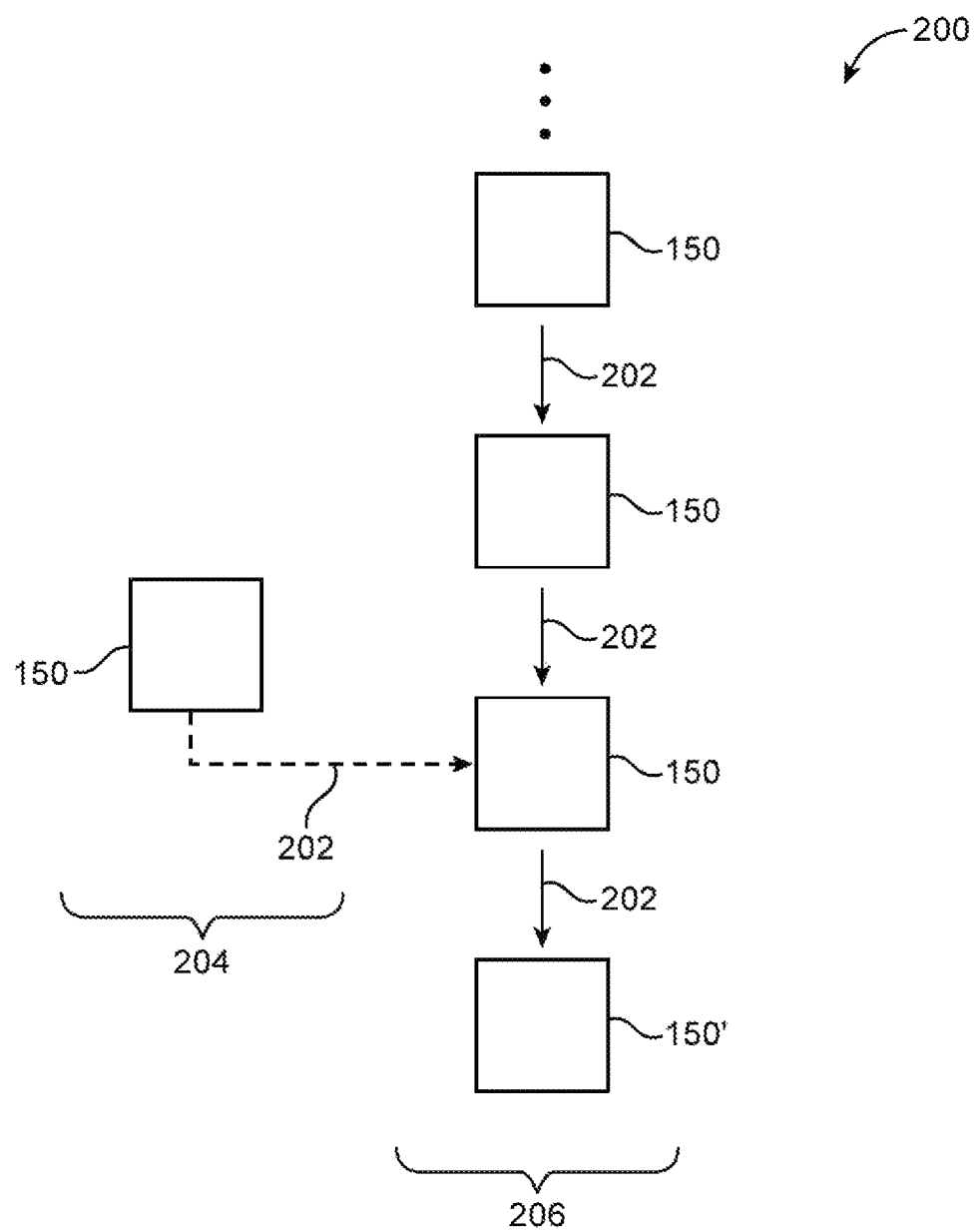
FIG. 9 is an illustrative block chain that may be maintained by a network of nodes as a global ledger of digital currency transactions in accordance with an embodiment of the present invention.

FIG. 9 is an illustrative diagram of a global ledger that is formed from a block chain 200. As shown in FIG. 9, block chain 200 may include an originating block 150' that does not point to any previous block. For example, the previous block identifier 164 of block 150' does not identify any other blocks. Each successive block 150 identifies the previous block in the chain as shown by arrows 202 (e.g., the previous block identifier 164 of each block identifies the previous block in block chain 200).

During mining operations, a device collects a set of transactions that have not already been recorded in block chain 200. The mining circuitry may identify the last (most recently recorded) block in block chain 200. The mining circuitry may subsequently generate a new block 150 from the set of transactions such that the new block includes an identifier 164 that identifies the last block of block chain 200 and solves the cryptographic puzzle of the cryptocurrency protocol used by the block chain.

It is possible for block chain 200 to include multiple branches. For example, branch 204 may be generated when different puzzle solutions are discovered that each have the same previous block identifier. In this scenario, the branch that is longer and includes more blocks serves as the global register. In other words, branch 204 is ignored and the transactions in block 150 of branch 204 are not considered to be recorded, because branch 206 includes more blocks than branch 204 (i.e., four connected blocks in branch 206 compared to only three in branch 204).

Figure 10:
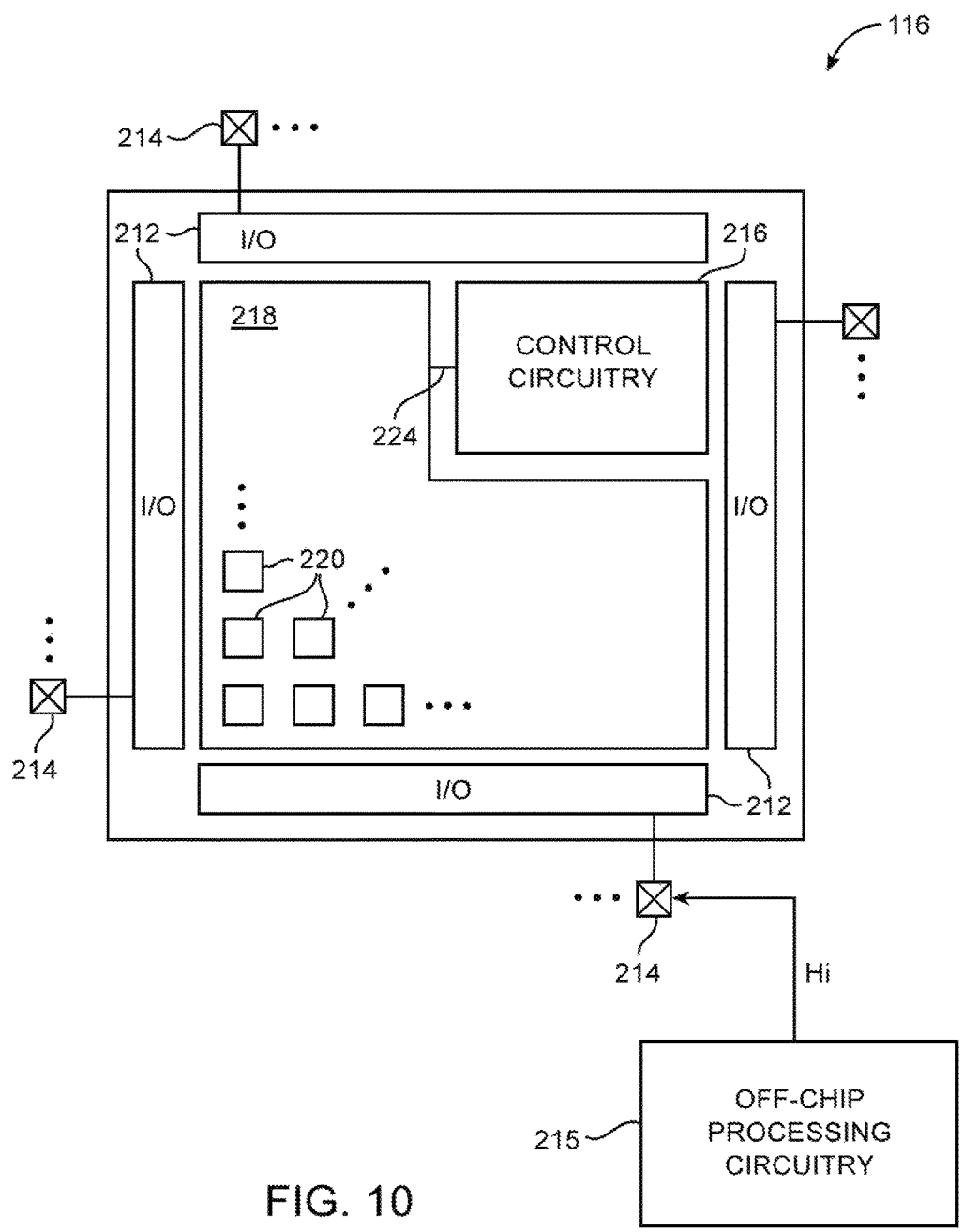
FIG. 10 is an illustrative diagram of mining circuitry including control circuitry and multiple processing cores for performing cryptographic hashing functions in parallel on corresponding portions of a search space in accordance with an embodiment of the present invention.

Mining circuitry such as circuitry 116 of FIG. 2 may be implemented as a dedicated integrated circuit (e.g., an application-specific integrated circuit) as shown in the diagram of FIG. 10. As shown in FIG. 10, integrated circuit 116 may have input-output (I/O) circuitry 212 for driving signals off of device 116 and for receiving signals from other devices via input-output pins 214. For example, I/O circuitry 212 and pins 214 may convey signals between mining circuitry 116 and other circuitry on electronic device 110 of FIG. 2. As shown in FIG. 10, mining circuitry 116 may receive data from off-chip processing circuitry such as processing circuitry 215. Off-chip circuitry 215 may be used to pre-compute portions of the hashing functions performed by circuitry 116. For example, off-chip circuitry 215 may compute hash values of portion 174 of block header 152 as shown in FIG. 7 and may provide the hash value (e.g., hash value $H_i$) to circuitry 116. In another suitable arrangement, hash value $H_i$ may be provided by mining control circuitry 216. Circuitry 116 may use hash value $H_i$ as an input when performing hashing functions on portion 176 of block header 152.

Mining circuitry 116 may include a core region 218 and control circuitry 216 that is coupled to the core region by paths 224 such as interconnect paths. Core region 218 may include multiple core circuits 220 that may be controlled by control circuitry 216 to identify solutions to a cryptographic puzzle. For example, each core circuit 220 may include dedicated logic that performs a cryptographic algorithm such as the SHA function on inputs provided by control circuitry 216 over paths 224. Core region 218 may include any desired number of core circuits that are operated in parallel by control circuitry 216 (e.g., tens, hundreds, or more core circuits).

The inputs provided by control circuitry 216 to a given core 220 may include a partially filled block header. For example, the partially filled block header may include header fields 162, previous block identifier 164, a current time, and difficulty value 170. The inputs may include the Merkle root of the transactions of the block to be solved, the transactions themselves, or sufficient information for computing the Merkle root (e.g., Merkle tree edge 186 of FIG. 8). The inputs may include hash values $H_i$ computed by off-chip processing circuitry 215. The remaining fields of the block header and block may be generated by core 220 in attempting to solve the cryptographic puzzle with inputs provided by the control circuitry.

Control circuitry 216 may partition the search space of possible solutions to the cryptographic puzzle and assign each core circuit 220 a different portion of the search space (e.g., so that multiple core circuits 220 operating in parallel can more efficiently search for solutions to the cryptographic puzzle). The search space may be partitioned based on the inputs provided by the control circuitry to the core circuits. The search space may be partitioned, for example, by assigning different ranges of nonce values 172 to different cores 220, by assigning different ranges of extra nonce values to different cores 220, etc.

If desired, each core circuit 220 in mining circuitry 116 may include dedicated logic that performs cryptographic hash functions such as Secure Hash Algorithm (SHA) functions. For example, cores 220 may perform SHA-2 hash functions (e.g., SHA-256 hash functions that are computed with 32-bit words as a message schedule input to each round of hashing and that outputs 256-bit hash outputs) on inputs provided by control circuitry 216 over paths 224.

Figure 11:
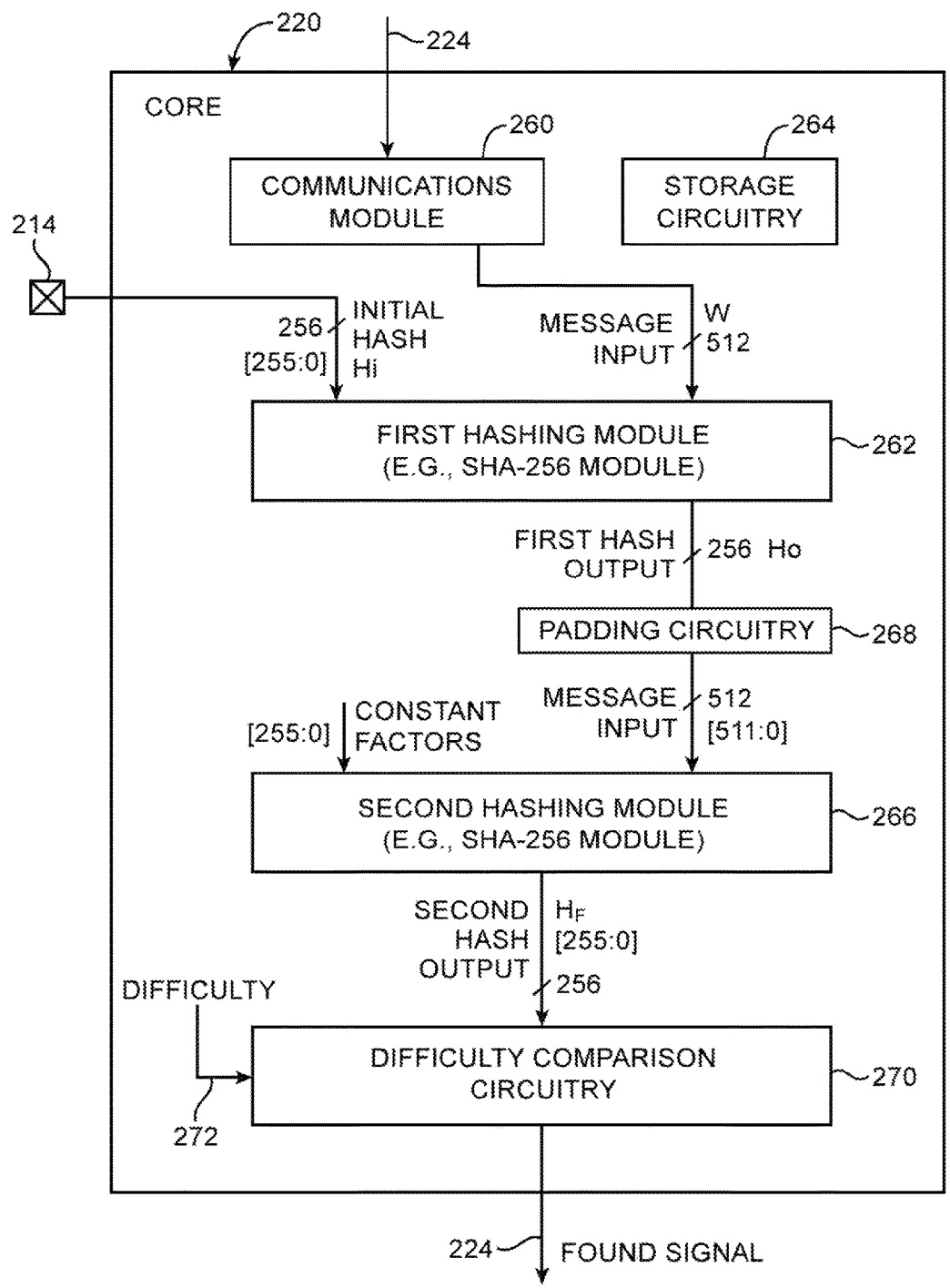
FIG. 11 is an illustrative diagram of a processing core in mining circuitry that may perform rounds of cryptographic hashing (e.g., SHA-256 hashing) and that may share logic with neighboring cores in the mining circuitry in accordance with an embodiment of the present invention.

FIG. 11 is an illustrative diagram of an exemplary core 220 in circuitry 116 of FIG. 10. In the example of FIG. 11, circuitry 220 is used for performing SHA-256 hashing on inputs received from control circuitry 216. However, this is merely illustrative and in general, core 220 may be used to perform any desired hashing algorithm on inputs received from control circuitry 216 (e.g., for use in a bitcoin protocol, another digital currency protocol, or for use in a cryptographic system unrelated to a digital currency), or core 220 may be formed separate from mining circuitry 116 (e.g., on a dedicated integrated circuit or integrated circuit separate from mining circuitry 116) and may generally perform cryptographic hashing functions (e.g., SHA-256 hashing) on any desired input received from any desired source.

As shown in FIG. 11, core 220 may include communications circuitry such as communications module 260 that receives a message input W from control circuitry 216 via path 224. The message input W received from control circuitry 216 may include portions of block header 152 for use as an input to a SHA-256 hashing algorithm, for example. Core 220 may receive an initial hash input $H_i$ from external circuitry 215 via input/output port 214. The initial hash input $H_i$ may be computed off-chip based on a portion of a bit coin block header. For example, initial hash input $H_i$ may be computed at circuitry 215 by hashing portion 174 of block header 152 (e.g., using single or double hashing with a SHA-256 hashing protocol). Core 220 may include storage circuitry 264 that includes volatile and/or non-volatile memory.

If desired, core 220 may include multiple sequential hashing modules such as first hashing module 262 and second hashing module 266. First and second hashing modules 262 and 266 may be used to perform a double SHA-256 hash based on initial hash $H_i$ and the message input received on line 224. For example, first hashing module 262 (sometimes referred to herein as first SHA-256 module 262) may perform SHA-256 hashing on initial hash $H_i$ and message input W to produce a first hash output $H_O$. The first hash output $H_O$ may be provided to as a message input to second hashing module 266 (sometimes referred to herein as second SHA-256 module 266). Second hashing module 266 may receive constant factors as an initial hash input (e.g., constant factors determined by the SHA-256 hashing algorithm such as one or more prime numbers). Second hashing module 266 may perform SHA-256 hashing on the constant factors using a message schedule based on first hash output $H_O$ to produce a second hash output $H_F$ (sometimes referred to herein as a final hash output).

In the example of FIG. 11, initial hash $H_i$ includes 256 bits whereas message input W includes 512 bits. First hash output $H_O$ may include 256 bits (e.g., as determined by the SHA-256 algorithm implemented by first hashing module 262). Core 220 may include padding circuitry 268 for padding first hash output $H_O$ with a desired number of zeros so that padded first hash output $H_O$ includes 512 bits (e.g., so that first hash output $H_O$ can be used as the 512-bit message input to second SHA-256 module 266). The constant factors input to second hashing module 266 may include 256 bits. Second hash output $H_F$ may include 256 bits (e.g., as determined by the SHA-256 algorithm implemented by second hashing module 266).

Core 220 may include difficulty comparison circuitry 270. Second hash output $H_F$ may be provided to difficulty comparison circuitry 270. Difficulty comparison circuitry 270 may compare second hash output $H_F$ to a predetermined difficulty value received at input 272. Difficulty value 272 may, for example, be received from control circuitry 216 or other desired external circuitry. Difficulty value 272 may, for example, be specified by the digital currency protocol implemented by mining circuitry 116 or by any other source (e.g., the difficulty value may be determined by the network of nodes operating on the bitcoin protocol and may be adjusted over time so that a predictable number of solutions to the cryptographic puzzles are computed by the entire network in a given time period).

If second hash output $H_F$ satisfies the predetermined difficulty value (e.g., if a number of least significant zero bits as specified by the Bitcoin protocol is sufficient or if value $H_F$ is less than the predetermined difficulty value), a found signal may be issued on line 224 indicating that a solution has been found for the given initial hash $H_i$ and message input W (e.g., for the bitcoin block header associated with the initial hash and message). If no solution is found, the search space may be changed (e.g., using a different timestamp field 168, nonce field 172, extra nonce field, etc.) and computation may be repeated until a solution is found, until the search space is changed again, or until a new block 150 in block chain 200 (FIG. 9) is received.

Each hashing module 262 and 266 may perform multiple rounds of SHA-256 hashing (e.g., as specified by the SHA-256 hashing protocol). Each round of hashing may involve performing the same logical functions on an input to that round to produce an output for that round. Each round of hashing may receive a portion of the message input W (e.g., a 32-bit word of the message input or a modified 32-bit word derived from the message input W). The output of a given round may serve as an input for the next round (along with another word from the message input).

In a scenario sometimes described herein as an example (e.g., when operating under the Bitcoin or SHA-256 protocol), first hashing module 262 may perform 64 rounds of hashing based on initial hash $H_i$ and input message W to produce first hash output $H_O$. Similarly, second hashing module 266 may perform 64 rounds of hashing based on the constant factors and first hash output $H_O$ to produce second hash output $H_F$. In typical scenarios, each round of SHA-256 hashing performed by first hashing module 262 (or second hashing module 266) may be performed by dedicated logic on core 220. The output of a first round of SHA-256 logic in first hashing module 262 may serve as an input to the second round of SHA-256 logic in first hashing module 262 (along with a word generated by message schedule logic based on input message W), the output of which may serve as an input to a third round of SHA-256 logic in first hashing module 262 (along with an additional word generated by the message schedule logic based on input message W), etc. Each round of SHA-256 performed by first hashing module 262 and second hashing module 266 may include a hash input and a corresponding message input. The hash input and message input may be combined as determined by the SHA-256 protocol to produce a hash output used as a hash input of the subsequent round of SHA-256 hashing. Hash values output by each of the rounds of SHA-256 logic except for the final round may sometimes be referred to herein as intermediate hashing values, whereas hash values generated by the final round of SHA-256 logic may sometimes be referred to herein as hash output values or output hash values. The hash output of the final (e.g., $64^{th}$) round may sometimes be referred to herein as the hash output value $H_O$ or $H_F$. If desired, the hash output value may be combined with the corresponding initial hash value $H_i$ using adder circuitry to generate a value sometimes referred to herein as a final hash value.

Figure 12:
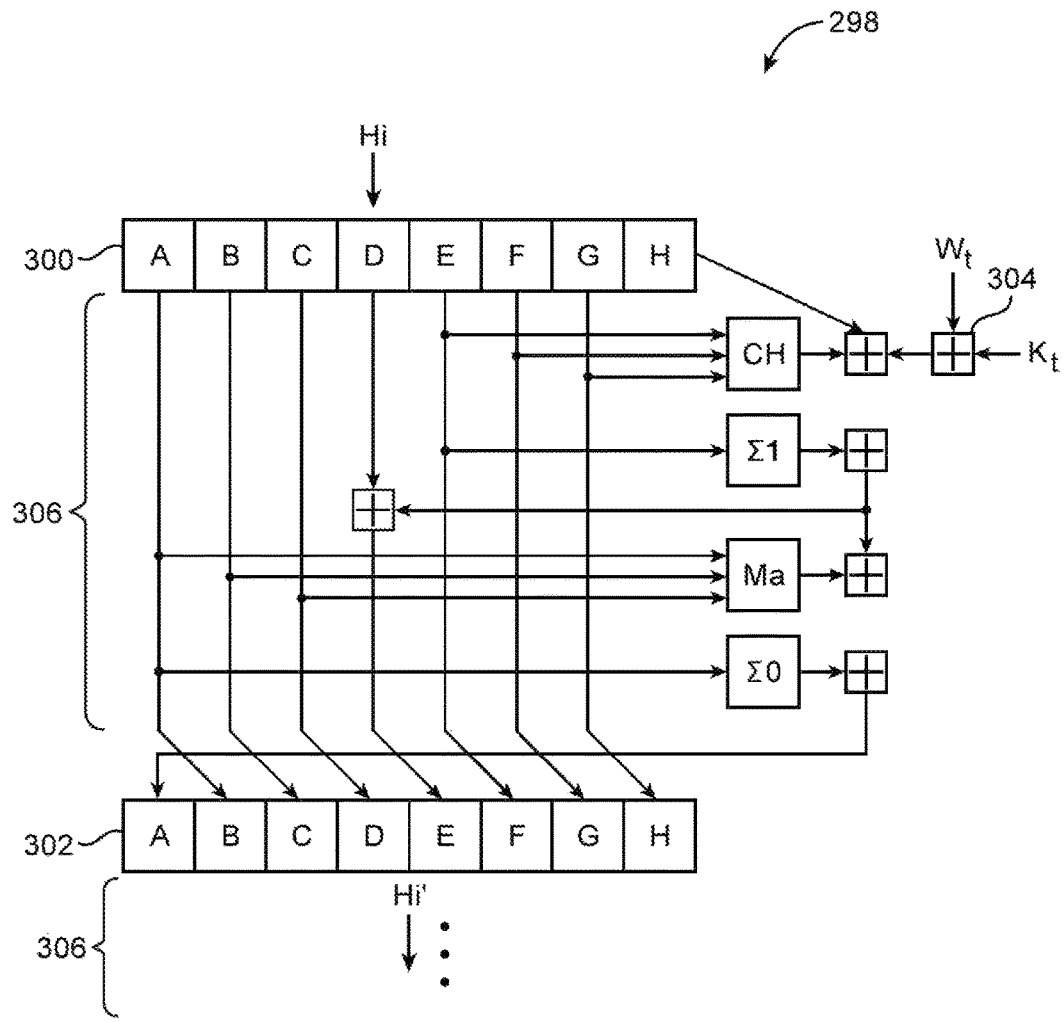
FIG. 12 is an illustrative diagram of a round of hashing logic that may perform a round of a hash schedule (e.g., a round of SHA-256 hashing) on an input hash value and a word received from message scheduling circuitry to generate a hash output in accordance with an embodiment of the present invention.

The logical operations implemented by the SHA-256 hashing protocol may be performed by dedicated logic hardware (e.g., hardcoded circuitry) on first and second hashing modules 262 and 266, for example. Performing logical operations using hardware may be significantly faster than performing the same logical operations using software. FIG. 12 is an illustrative diagram of a single round of the SHA-256 hashing function logic that may be formed using dedicated logic on core 220. The circuitry of FIG. 12 may be implemented on the first and/or second hashing modules of FIG. 11 and may be repeated on the hashing module for each number of rounds implemented by the hashing module (e.g., the circuitry of FIG. 12 may be repeated 64 times in each hashing module). The circuitry of FIG. 12 may sometimes be referred to herein as a hash schedule, hash scheduling circuitry, hash schedule logic, or hash scheduling logic.

As shown in FIG. 12, SHA-256 hashing circuitry 298 may include storage circuitry such as storage circuitry 300 and 302 (e.g., register circuitry 300 and 302). Register circuitry 300 may serve as an input register to the corresponding round of SHA-256 hashing logic 306. Data stored on register circuitry 300 may be passed to SHA-256 hashing logic 306 and operated on according to the SHA-256 hashing protocol (e.g., as shown in the logical diagram of FIG. 12). The output of SHA-256 logic 306 may be passed to output register 302. In typical arrangements, register circuitry 300 and 302 each include eight corresponding registers A-H (e.g., a first register A, a second register B, a third register C, etc.) that each stores a corresponding 32-bit hash value (e.g., register A may store the most significant 32 bits of initial hash $H_i$, whereas register H stores the least significant 32 bits of initial hash $H_i$, for the first round of hashing). In other words, a 256 bit hash input $H_i$, may be partitioned into eight 32-bit hash values A-H each stored on a corresponding register of input register circuitry 300. Each 32-bit hash value may be passed to logic 306 along with portions (words) $W_t$ of message input W. The output of logic 306 may be stored on register circuitry 302 (e.g., the output of logic 306 may be partitioned into 32-bit hash values A-H each stored on a corresponding register of output register circuitry 302).

As an example, hash schedule logic 298 of FIG. 12 may be a first round of SHA-256 hashing logic formed on hashing module 262. In this scenario, register 300 may receive and store initial hash $H_i$ received over input/output port 214 (e.g., partitioned into 32-bit hash portions A-H). A 32-bit input message word $W_t$ may be generated by message scheduling circuitry based on input message W. Adder circuitry 304 (e.g., addition modulo 32 circuitry) may receive word $W_t$ from the message scheduling circuitry as well as a SHA-256 constant value $K_t$. Constant value $K_t$ may be specified by the SHA-256 hashing protocol and may correspond to the particular round number of SHA-256 implemented between registers 300 and 302 (e.g., $K_t$ may have a first value for the first round of SHA-256, a second value for the second round of SHA-256, a third value for the $64^{th}$ round of SHA-256, etc.).

Input word $W_t$ may be provided to hash scheduling circuitry 298 by corresponding message scheduling logic on core 220. The message scheduling logic may receive message input W from communications module 260 (FIG. 11) and may perform operations on message W according to the SHA-256 protocol to generate message input words $W_t$. For example, the message scheduling logic may perform logical operations on input message W and may output a single 32-bit word $W_t$ of the input message W after performing the logical operations at any given time. A corresponding message input word $W_t$ may be provided to adder 304 for each round of SHA-256 in hashing module 262 (e.g., a first word $W_t$ may be provided during the first round of SHA-256, a second word $W_t$ may be provided during the second round of SHA-256, etc.). Word $W_t$ may be the most significant word of the message stored in the message scheduling logic at a given time.

The 32-bit hash values stored on registers 300, the corresponding message input word $W_t$, and the corresponding round constant value $K_t$ may be passed to and processed by logic 306 as shown and defined in FIG. 12. The processed 32-bit hash values may be stored on output registers 302. The logical functions performed by logic blocks Ch, $\Sigma 1$, Ma, and $\Sigma 0$ in logic 306 are defined as shown in FIG. 12. The arrangement of logic circuitry 306 of FIG. 12 is determined by the SHA-256 protocol and is merely illustrative. In general, any desired logic may be formed in circuitry 306 for operating on input hash values stored in registers 300.

The 32-bit processed hash values stored in registers 302 may be provided to a subsequent round of logic 306 (e.g., logic circuitry having the same configuration as shown in FIG. 11) and the output of the subsequent round of logic may be provided to an additional bank of register circuits. In this way, each of the 64 rounds of SHA-256 logic on hashing module 262 (or hashing module 266) may include corresponding logic circuitry 306 and register circuitry 300/302. In another suitable arrangement, the output of register 302 may loop back to register 300 for two or more of the 64 rounds of SHA-256 hashing. After the final round of hashing 298 (e.g., the $64^{th}$ round), the process hash value stored on registers 302 in the $64^{th}$ round of logic circuitry may be used as hash output $H_O$ of FIG. 11 (e.g., after passing through 64 rounds of logic 306, first hash output $H_O$ may be produced as the hash value stored on the final output register circuitry 302 of first hashing module 262). Hash output $H_O$ may be passed to second hashing module 266 (FIG. 11). Similar logic may be formed on second hashing module 266 to generate final hash output $H_F$ using the constant factors as the initial hash value stored on input registers 300 of second hashing module 266 and using words from the message input corresponding to first hash output $H_O$.

Figure 13:
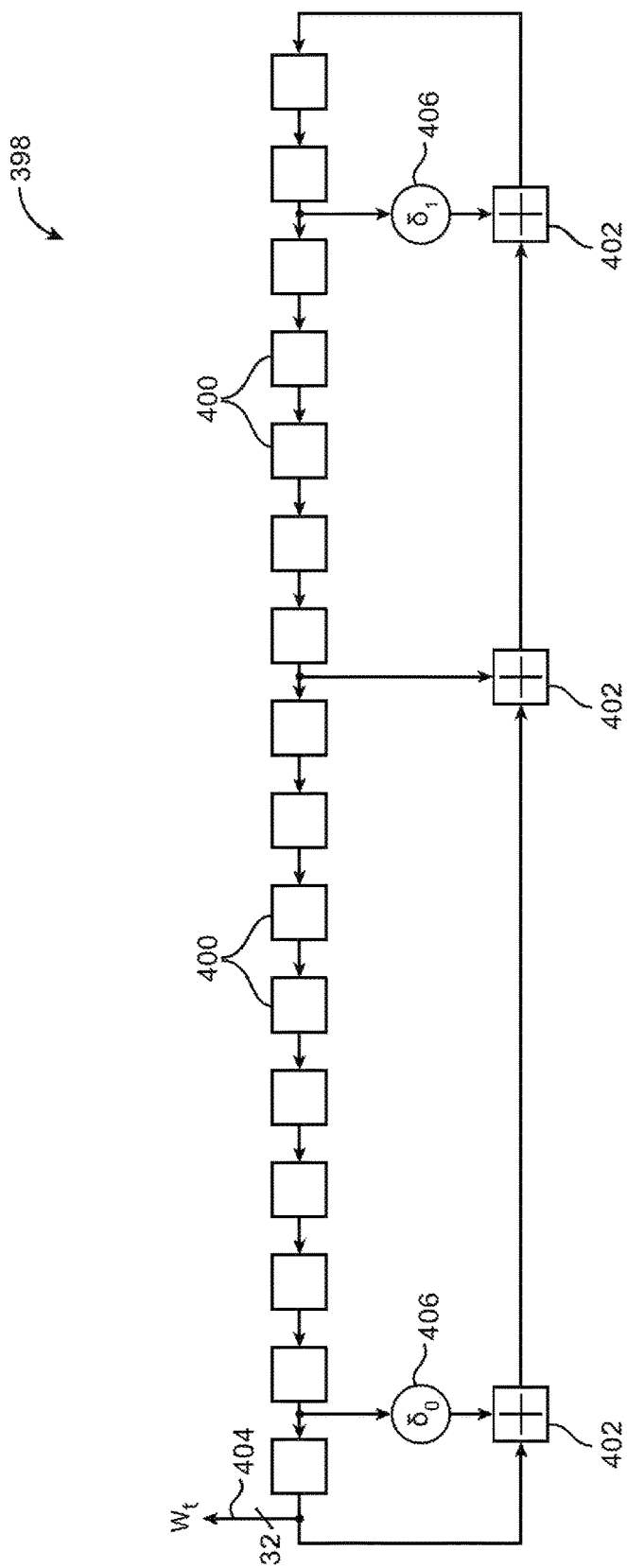
FIG. 13 is an illustrative diagram of message scheduling circuitry that may generate message words based on a received message and that may provide the message words to rounds of hashing logic of the type shown in FIG. 12 for generating a hash output in accordance with an embodiment of the present invention.

FIG. 13 is an illustrative diagram of message scheduling logic 398 formed on the first and/or second hashing modules of FIG. 11 for generating input words $W_t$ provided to hash schedule logic 298 based on received message W. An initial message such as 512-bit message input W of FIG. 11 may be stored in registers 400. Each register 400 may store a corresponding 32-bit portion (word) of message W. The stored message W may be shifted through registers 400 word-by-word for each round of SHA-256 performed by hash scheduling circuitry 298. The most significant 32-bit word $W_t$ after each shift through registers 400 may be provided as input word $W_t$ to the corresponding round of hash scheduling logic 298. In this way, each 32-bit input word $W_t$ is based on the message input W received from controller 216.

For example, during the first round of SHA-256 hash schedule 298 as shown in FIG. 12, a first most significant 32-bit word $W_t$ may be provided to adder 304 over path 404, and each word stored on registers 400 may be shifted over to the next register 400 (e.g., in a direction to the left as shown in FIG. 13). The most significant 32-bit word $W_t$ after shifting the words may be provided to adder 304 over path 404 and the words may be shifted again to the next register 400. This process may continue so that a different message input word $W_t$ is provided to each of the 64 rounds of SHA-256 hash scheduling logic 298. Some of the words stored on registers 400 may be passed to logic 406 and adder circuits 402 (addition modulo two adder circuits 402) and a corresponding word may be provided to the last (least significant) register 400 in message scheduling logic 398.

In the example where message scheduling circuitry 398 is formed in first hashing module 262, the 512-bit message initially stored on registers 400 may be message input W received from controller 216. In the example where message scheduling circuitry 398 is formed on second hashing module 266, the 512-bit message initially stored on registers 400 may be first hash output $H_0$ (e.g., after padding to 512 bits using padding circuitry 268) generated by first hashing module 262. The arrangement of logic 406, registers 400, and adders 402 may be determined by the SHA-256 hashing protocol. This example is merely illustrative and, if desired, any arrangement of registers 400, logic 406, and adders 402 may be used for generating message words $W_t$.

Each core 220 in mining circuitry 116 may include first and second hashing modules 262/266. This example is merely illustrative and in general, cores 220 may include any desired number of hashing modules that perform any desired number of rounds of hashing using any desired hashing protocol. In the example of FIGS. 11-13, each core 220 may include 64 rounds of hash scheduling logic 298 (as shown in FIG. 12) and corresponding message scheduling logic 398 (as shown in FIG. 13) for computing hash values in parallel (e.g., for finding a solution to the cryptographic puzzle more efficiently than if only a single core is used). For example, the first hashing module of a first core 220 may include 64 rounds of hash scheduling logic 298, the first hashing module of a second core 220 adjacent to the first core may include 64 rounds of hash scheduling logic, etc. Each round of hashing logic may require a predetermined amount of chip area on mining circuitry 116 and a predetermined amount of power for computing SHA-256 hash functions. It may therefore be desirable to be able to reduce area and power used by cores 220 for computing hash functions in parallel to reduce chip cost and increase power efficiency.

If desired, portions of message scheduling logic 398 and/or hash scheduling logic 298 may be shared across multiple cores 220. For example, register circuitry 300 and 302 and/or logic circuitry 306 from one or more rounds of hash scheduling logic 298 in the first or second hashing module may be shared between two or more cores 220 (e.g., so that multiple cores use a single logic circuit for at least some of the 64 rounds of SHA-256 hashing). In this way, the total area required by hash scheduling circuitry 298 and message scheduling circuitry 398 across multiple cores 220 may be reduced on integrated circuit 116 (and corresponding power leakage may be minimized).

Figure 14:
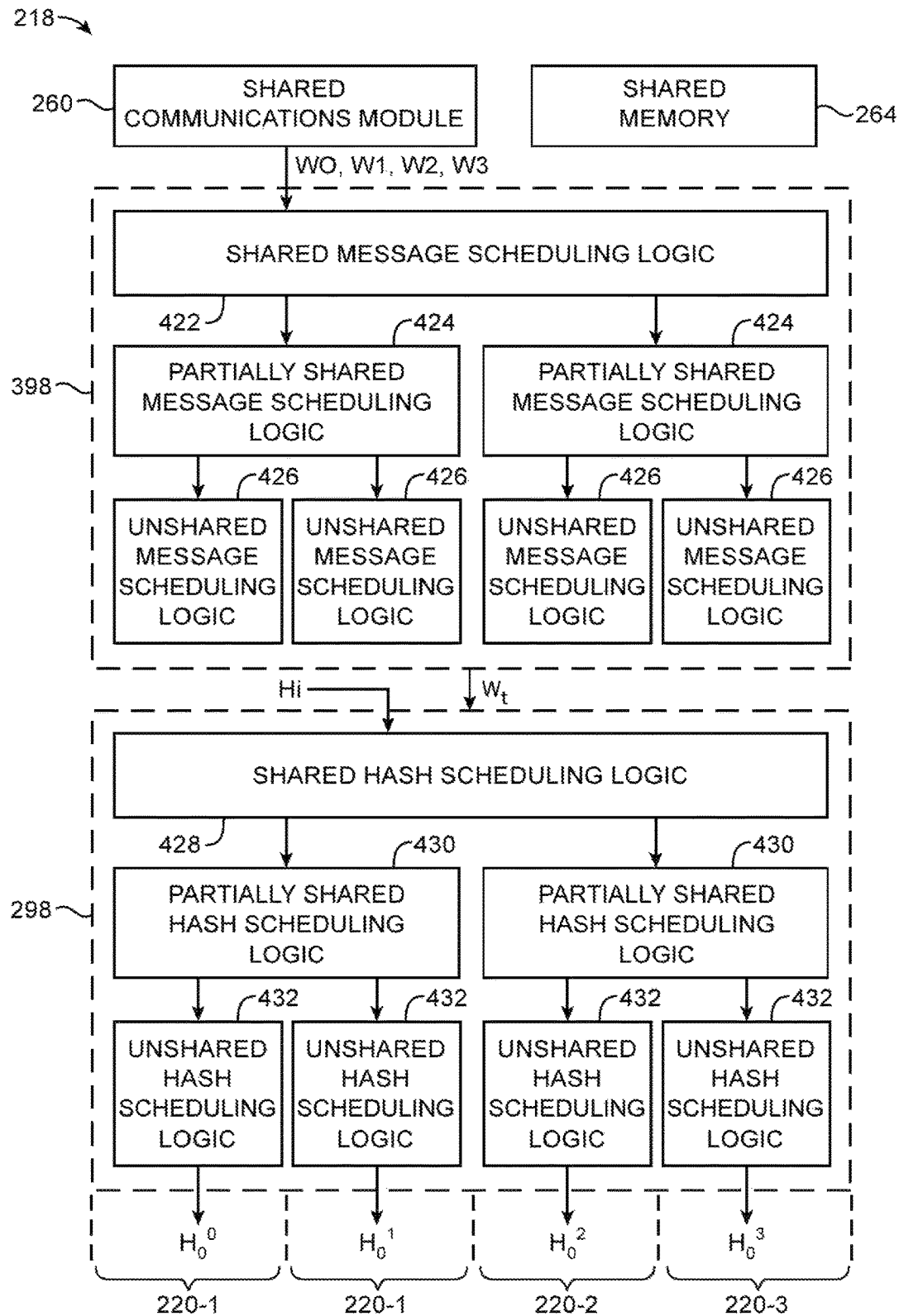
FIG. 14 is an illustrative diagram showing how neighboring processing cores on mining circuitry of the type shown in FIGS. 10-13 may share message scheduling logic and hash scheduling logic to reduce chip area consumption in accordance with an embodiment of the present invention.

FIG. 14 is an illustrative block diagram showing how multiple cores 220 in core region 218 on mining circuitry 116 may share common message scheduling logic circuitry and common hash scheduling logic circuitry to minimize chip area consumed by the corresponding hashing modules.

As shown in FIG. 14, core region 218 may include adjacent hashing cores 220 (e.g., a first core 220-0, a second core 220-1, a third core 220-2, and a fourth core 220-4). Each core 220 may be formed on a corresponding logic region (area) on mining circuitry 116 (e.g., first core 220-0 may be formed on a first region of circuitry 116, second core 220-1 may be formed on a second region of circuitry 116 adjacent to the region of first core 220-0, third core 220-2 may be formed on a third region adjacent to second core 220-1, and fourth core 220-3 may be adjacent to third core 220-2). The example of FIG. 14 is merely illustrative. In general, any desired number of adjacent cores 220 may share hash and message scheduling logic.

Cores 220 may share a common communications module 260 for interfacing with controller 216 if desired. Shared communications module 260 may pass messages W from controller 216 to message scheduling logic 398 on cores 220 (a first message W0 identifying the corresponding search space for core 220-0, a second message W1 identifying the corresponding search space for core 220-1, a third message W2 identifying the corresponding search space for core 220-2, and a fourth message W3 identifying the corresponding search space for core 220-3). Messages W0-W3 may include common bits (e.g., common portions) that are shared among messages W0-W3 and uncommon bits (portions) that are different between two or more of messages W1-W3 (e.g., because much of the search space represented by messages W1-W3 may overlap). Message scheduling logic 398 in cores 220 may include shared message scheduling logic 422. Shared message scheduling logic 422 may be shared between each of the cores 220 (e.g., some of all of the cores in region 218). In the example of FIG. 14, shared message scheduling logic may be formed in one or more of core regions 220-0, 220-1, 220-2, and 220-3 or may be distributed across each of core regions 220-0, 220-1, 220-2, and 220-3.

Shared message scheduling logic 422 may utilize commonalties (e.g., common bits or portions) in messages W0-W3 provided to different cores 220 to generate the same message input words $W_t$ for each of cores 220-0 through 220-3 for a desired number of rounds of SHA-256 hashing performed by hash scheduling circuitry 298. The desired number of rounds may correspond to a number of rounds at which the most significant words of messages W0, W1, W2, and W3 are the same (e.g., regardless of which core the messages were generated for when partitioning the search space). After the desired number of rounds of SHA-256 hashing, partially shared message scheduling logic 424 may be used to generate message input words $W_t$ for a subset of the four cores 220. Partially shared message scheduling logic 424 may be formed in a subset of core regions 220-0, 220-1, 220-2, and 220-3 or may be distributed across subsets of core regions 220-0 through 220-3.

In the example of FIG. 14, two partially shared message scheduling logic circuits 424 are each shared by two cores 220. Each partially shared message scheduling logic circuit may provide the same message input word $W_t$ to its corresponding subset of cores 220 for a desired number of rounds of SHA-256 hashing (e.g., a first circuit 424 may be shared by cores 220-0 and 220-1 and may provide the same message words $W_t$ to cores 220-0 and 220-1 for a desired number of hash rounds subsequent to using shared message scheduling logic 422 to generate the message words, a second circuit 424 may be shared by cores 220-2 and 220-2 and may provide the same message words $W_t$ to cores 220-2 and 220-3 for the desired number of hash rounds subsequent to using shared message scheduling logic 422, etc.). The desired number of rounds for which partially shared logic 424 is used may correspond to a number of rounds at which the most significant words of messages W0, W1, W2, and W3 are the same regardless of which of the cores associated with the respective partially shared circuit 424 the messages were generated for.

After partially shared message scheduling logic has been used to provide message input words $W_t$ to its corresponding core hash scheduling logic, unshared message scheduling logic 426 may be used to generate words $W_t$ for each core 220 (e.g., words that are different across the cores). In this way, unshared message logic 426 in core region 220-0 may generate words $W_t$ for hash logic 298 in core region 220-0, logic 426 in core region 220-1 may generate words $W_t$ for hash logic 298 in core region 220-1, etc. (e.g., because words W0, W1, W2, and W3 generated for cores 220-0, 220-1, 220-2, and 220-3, respectively, will eventually have 32-bit words that are dissimilar across cores, as the search space for each core was partitioned by controller 216). In this way, message scheduling logic 398 may take advantage of shared bits across messages W0, W1, W2, and W3 to use a single message scheduling logic circuit 422 to provide words $W_t$ to hash circuitry 298 for the shared portions of messages W0, W1, W2, and W3 and may take advantage of shared bits across a subset of messages W0, W1, W2, and W3 to use partially shared message schedule circuits 424 to provide words $W_t$ to hash circuitry 298 for the bits shared across the subset of messages. By using shared and partially shared message scheduling logic, circuitry 218 may reduce the area on chip 218 consumed by message scheduling logic 398 relative to scenarios where separate and distinct message scheduling circuitry is used for each core 220.

Hash scheduling logic 298 in cores 220 may include shared hash scheduling logic 428 shared between each of the cores 220. In the example of FIG. 14, shared hash scheduling logic 298 may be formed in one or more of core regions 220-0, 220-1, 220-2, and 220-3 or may be distributed across each of core regions 220-0, 220-1, 220-2, and 220-3.

Shared hash scheduling logic 428 may include a predetermined number of rounds of SHA-256 logic. For example, shared logic 428 may include logic for computing the first four rounds of SHA-256 (e.g., using the logic shown in FIG. 12). Shared logic 428 may receive hash input $H_i$ from I/O port 214 and may perform the logical operations as shown in FIG. 12 based on messages $W_t$ received from message scheduling logic 398. Shared hash scheduling logic 298 may utilize commonalties in messages W provided to different cores 220 to use the same logic circuits for a given number of rounds of SHA-256 for each of the cores 220 (e.g., rounds for which the result of SHA-256 will be the same regardless of core because messages W0, W1, W2, and W3 generated for those cores is the same).

Cores 220 may include partially-shared hash scheduling logic circuits 430 coupled to shared hash scheduling logic 428. For example, shared hash scheduling logic 428 may include the hash logic and register circuitry associated with a first number of the 64 rounds of SHA-256 hashing, whereas partially shared logic 430 may include the logic and register circuitry associated with a second number of subsequent rounds of SHA-256 hashing. In the example of FIG. 14, a first partially shared hash scheduling logic circuit may be shared between cores 220-0 and 220-1 whereas a second partially shared hash scheduling logic circuit may be shared between cores 220-2 and 220-3 (e.g., because cores 220-0 and 220-1 may have common words from messages W0 and W1 for the second number of rounds subsequent to the first number of rounds whereas cores 220-2 and 220-3 may have common words from messages W2 and W3 for the second number of rounds).

Cores 220 may include unshared hash scheduling logic circuits 432 coupled to corresponding partially shared hash scheduling logic circuits 430. After the second number of rounds of SHA-256 associated with partially shared hash logic circuitry 430 have been completed, each core 220 may compute the remaining rounds of SHA-256 using respective unshared hash scheduling logic (e.g., because at this point, messages W0, W1, W2, and W3 are different across each core 220 as determined by the assigned search space for each core). Each unshared hash scheduling logic circuit 432 may output a corresponding first hash output value $H_0$ to be passed to second hashing module 266 within that core 220 (e.g., a first value $H_0^0$ may be generated by first core 220-0, a second value $H_0^1$ may be generated by second core 220-1, a third value $H_0^2$ may be generated by third core 220-2, and a fourth value $H_0^3$ may be generated by fourth core 220-3). If desired, each hash output value may be added to the hash input value $H_i$ using adder circuitry (not shown). In this way, commonalties in the most significant words of messages W0-W3 may be utilized to share hash scheduling circuitry across all or some of cores 220 for a given number of the 64 rounds at the beginning of SHA-256 hashing. By using shared and partially shared hash scheduling logic, circuitry 218 may reduce the area on chip 218 consumed by hash scheduling logic 298 relative to scenarios where separate and distinct hash scheduling circuitry is used for each core 220.

The example of FIG. 14 is merely illustrative. If desired, message scheduling logic 398 may be shared across cores whereas hash scheduling logic 298 is not shared across cores. Similarly, hash scheduling logic 298 may be shared across cores whereas message scheduling logic 398 is not shared across cores. If desired, any combination of shared message scheduling logic 422, partially shared message scheduling logic 398, and unshared message scheduling logic 426 may be omitted from message scheduling circuitry 398. If desired, any combination of shared hashing circuitry 428, partially shared hashing circuitry 430, and unshared hashing circuitry 432 may be omitted from hashing circuitry 298.

Figure 15:
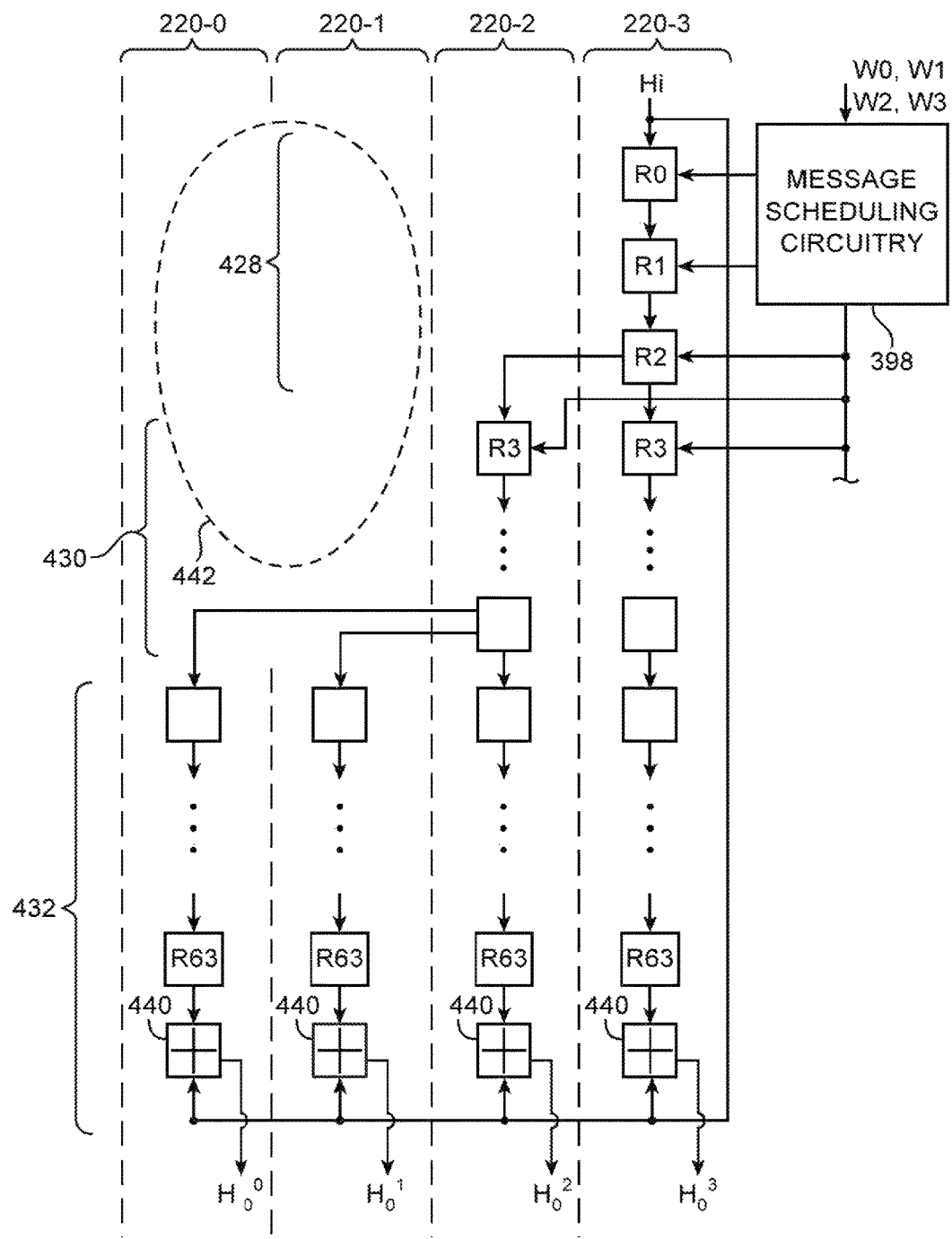
FIG. 15 is an illustrative diagram showing how different rounds of hashing logic may be shared by a set of processing cores on mining circuitry, may be partially shared by a subset of the set of processing cores, and/or may be formed on distinct processing cores based on commonalties in the messages provided for each of the processing cores (e.g., commonalties in the search space used by each of the cores) in accordance with an embodiment of the present invention.

FIG. 15 is an illustrative block diagram showing how different rounds of SHA-256 hashing may be computed using shared, partially shared, and unshared hashing circuitry across cores 220 (e.g., in an arrangement similar to that shown in FIG. 14).

As shown in FIG. 15, shared hash scheduling logic 428 may receive initial hash value $H_i$ from I/O port 214. A first round R0 of hash scheduling circuitry 298 (e.g., as shown in FIG. 12) may process initial hash $H_i$ and a word $W_t$ from message scheduling circuitry 398 and may provide an output of round R0 to second round R1 of hash scheduling circuitry 298. Message scheduling circuitry 398 is shown as a single block for the sake of clarity but may, if desired, include shared message scheduling logic 422, partially shared message scheduling logic 424, and unshared message scheduling logic 426 interspersed with hash scheduling circuitry 298 or formed around the periphery of hash scheduling circuitry 298. Hashing logic in SHA-256 hashing round R1 may provide an output to hashing logic round R2. Each round may include corresponding logic circuitry 306, input register circuitry 300, and output register circuitry 302, and may receive a corresponding word $W_t$ from message scheduling circuitry 398. Rounds R0, R1, and R2 of hashing logic 298 may form shared hash scheduling logic 428 (as shown in FIG. 14) because the output of rounds R0, R1, and R2 are used for generating hash value $H_0$ for multiple cores 220 (e.g., first core 220-0, second core 220-1, third core 220-2, and fourth core 220-3). In the example of FIG. 15, shared hash scheduling logic 428 is formed in core region 220-3 but may, in general, be formed in one or more of any desired core regions 220.

The output of round R2 may be passed to partially-shared hash scheduling logic 430. Partially-shared hash scheduling logic 430 may include multiple logic circuits that perform round R3 of SHA-256. In the example of FIG. 15, two hash scheduling logic circuits perform the hashing operations of round R3. The output of round R3 is provided to a subset of the four cores and is therefore partially shared (e.g., logic R3 in core 220-2 provides its output to cores 220-0, 220-1, and 220-2 whereas logic R3 in core 220-3 provides its output to core 220-3). After a predetermined number of rounds of partial sharing, partially shared hash scheduling logic 430 may provide outputs to unshared hash scheduling logic 432. After 64 total rounds of SHA-256 hashing (e.g., after round R63), the output of hashing logic R63 may be provided to adder circuitry (addition modulo two circuitry) 440. Adder circuitry 440 may add initial hash value $H_i$ to the output of hash scheduling logic R63 to produce respective first hash values $H_0$ for each core 220. By sharing and partially sharing one or more rounds of SHA-256 hashing logic across multiple cores 220, region 442 on mining circuitry 116 may be free from logic circuitry, thereby reducing area consumption and power leakage of cores 220 relative to scenarios where no logic sharing is implemented across cores 220.

As an example of how messages may be provided to shared, partially shared, and unshared hash scheduling circuitry, the input messages W provided to message scheduling logic 398 may include, in order of significance, a 32-bit Merkle root field, a 32-bit timestamp field, a 32-bit difficulty value field, a 32-bit nonce field, a fixed field including one high (e.g., logic "1") bit followed by 319 low (e.g., logic "0") bits (e.g., a padding field), and a fixed field identifying the size of the message. Four different input messages W0, W1, W2, and W3 may be provided by controller 216 for four cores 220, for example. In this example, the Merkle root field, timestamp field, difficulty value field, the fixed fields, and all but the two least significant bits of the nonce field may be shared across all four messages W0-W3, whereas the two least significant bits of the nonce field may be unique to each of the four messages (e.g., message W0 may have nonce least significant bits (LSBs) "00," message W1 may have nonce LSBs "01,' message W2 may have nonce LSBs "10," and message W3 may have nonce LSBs "11", representing the variation in search space between the four cores).

A given one of messages W0-W3 may be stored in registers 400 as shown in FIG. 13 (e.g., so that the most significant Merkle root field is stored in the first register 400 and the last 32-bits of the fixed fields is stored in the last register 400) or messages W0-W3 may be stored on respective registers 400. At a first round R0 of hash scheduling logic 298, the first 32-bit word of the message stored on registers 400 may be used as word input $W_t$. Because the Merkle root field is shared by all four messages W0-W3 (e.g., identical in each of the words), the word $W_t$ used for round R0 of the hash schedule would be the same for each of the four cores even though each core has a different respective message W0, W1, W2, or W3 generated by controller 216 (e.g., the same Merkle root field may be used for all four cores at round R0, thereby allowing the cores to share scheduling circuitry). The words stored on registers 400 may subsequently shift by one register (e.g., in a direction to the left as shown in FIG. 13). The timestamp field may then be stored on the first register of circuitry 398. As the word for round R0 of the hash schedule is the same for all four cores, the hashing logic may be shared between all four cores for round R0.

At the next round R1 of hash schedule logic 298, the timestamp field (e.g., the most significant 32-bit word after shifting) in memory schedule logic 398 may be provided as word input $W_t$ to round R1 of hash schedule logic 298. Because the timestamp field is shared by all four messages W0-W3 (and is thereby shared by all four cores), the word $W_t$ used for round R1 of the hash schedule may be used for all four cores thereby allowing the four cores to share round R1 hash schedule logic. The words stored on registers 400 may subsequently shift by one register. The difficulty field may then be stored on the first (most significant) register 400 of circuitry 398. As the word for round R1 of the hash schedule is the same for all four cores in this example, the same hashing logic circuit may be shared between all four cores for round R1.

At the subsequent round R2 of hash schedule logic 298, the difficulty field (e.g., the most significant 32-bit word after shifting) in memory schedule logic 398 may be provided as word input $W_t$ to round R2 of hash schedule logic 298. Because the difficulty field is shared by all four messages W0-W3 in this example, the word $W_t$ used for round R2 may be used for all four cores, thereby allowing the four cores to share round R2 hash schedule logic circuitry. The words stored on registers 400 may subsequently shift by one register. The nonce field may then be stored on the first register 400 of circuitry 398.

At subsequent round R3 of hash schedule logic 298, two different message words $W_t$ may be provided to the four cores because there is a 2-bit divergence in the nonce word provided by message schedule 398 (e.g., because the two LSBs of the nonce field varies between messages W0-W3). Round R3 of the hash schedule logic 298 will thereby be partially shared across cores such that two cores 220 share a first logic circuit to compute round R3 of SHA-256 and two additional cores 220 share a second logic circuit to compute round R3. In this scenario, the output registers 302 in the round R3 of the hash schedule will vary between pairs of cores 220 (e.g., registers A and E of register circuitry 302 will store different values depending on which message word $W_t$ is received such that two cores store a first set of bits on registers A and E and the two other cores store a second set of bits on registers A and E, whereas words stored on registers B, C, D, F, G, and H will be identical between all four cores). The words stored on registers 400 may subsequently shift by one register.

At subsequent round R4, the high bit of the fixed field and the first 31 low bits of the fixed field are provided as the word $W_t$ to the partially-shared hash scheduling logic of round R4. The output registers between pairs of cores will vary in the bits stored on registers B and F of output register circuitry 302. This pattern may continue for subsequent rounds R5 and R6 in this example until no hardware is shared and independent hash scheduling circuitry is formed in each of the four cores 220. This example is merely illustrative. Any desired logic may be shared for computing rounds of SHA-256 hashing on any desired message inputs.

The foregoing is merely illustrative of the principles of this invention and various modifications can be made by those skilled in the art without departing from the scope and spirit of the invention. The foregoing embodiments may be implemented individually or in any combination.

What is claimed is:

1. Cryptocurrency mining circuitry on an integrated circuit, comprising:
   a first processing core having first hashing circuitry;
   a second processing core having second hashing circuitry, wherein the first hashing circuitry and the second hashing circuitry each includes a plurality of sequential rounds of cryptographic hashing logic that performs cryptographic hashing operations based at least on an initial hash value and a plurality of message words;
   control circuitry that mines cryptocurrency by partitioning a search space of possible solutions to a cryptographic puzzle into a first search space and a second search space and assigning the first processing core to the first search space and the second processing core to the second search space to complete a cryptographic function according to a cryptocurrency protocol over the first and second search spaces; and
   shared message scheduling circuitry, electrically coupled to the control circuitry, an adder circuit of the first hashing circuitry, and an adder circuit of the second hashing circuitry, the shared message scheduling circuitry being constructed to:
      receive, from the control circuitry, a first message for the first search space of the first processing core and a second message for the second search space of the second processing core;
      generate a first message word based on at least the first message and the second message, wherein the plurality of message words comprise the first message word; and
      provide the first message word of the plurality of message words to a first round of cryptographic hashing logic in both the first hashing circuitry and the second hashing circuitry to solve the cryptographic puzzle.

2. The cryptocurrency mining circuitry defined in claim 1, further comprising:
   a third processing core having third hashing circuitry, wherein the third hashing circuitry includes a plurality of sequential rounds of cryptographic hashing logic that performs cryptographic hashing operations based at least on the plurality of message words, wherein the control circuitry controls the third processing core to complete the cryptographic function over a third search space.

3. The cryptocurrency mining circuitry defined in claim 2, wherein the shared message scheduling circuitry provides the first message word to a first round of cryptographic hashing logic in the third processing core.

4. The cryptocurrency mining circuitry defined in claim 3, further comprising:
   partially shared message scheduling circuitry that provides a second message word to a second round of cryptographic hashing logic in the first and second processing cores, wherein the second round of cryptographic hashing logic is subsequent to the first round of cryptographic hashing logic.

5. The cryptocurrency mining circuitry defined in claim 4, further comprising:
   unshared message scheduling circuitry that provides a third message word to a third round of cryptographic hashing logic in only the first processing core, wherein the third round of cryptographic hashing logic is subsequent to the first and second rounds of cryptographic hashing logic.

6. The cryptocurrency mining circuitry defined in claim 5, wherein the shared message scheduling circuitry is configured to generate the first message word based on a first message received from the control circuitry for the first processing core, a second message received from the control circuitry for the second processing core, and a third message received from the control circuitry for the third processing core.

7. The cryptocurrency mining circuitry defined in claim 6, wherein the partially shared message scheduling circuitry is configured to generate the second message word based on the first and second messages received from the controller.

8. The cryptocurrency mining circuitry defined in claim 7, wherein the unshared message scheduling circuitry is configured to generate the third message word based on the first message received from the controller.

9. The cryptocurrency mining circuitry defined in claim 8, wherein the first message comprises a 512-bit message, the initial hash value comprises a 256-bit initial hash value, the cryptographic hashing operations comprise Secure Hash Algorithm 256 (SHA-256) cryptographic hashing operations, and the cryptocurrency protocol comprises the Bitcoin protocol.

10. The cryptocurrency mining circuitry defined in claim 1, wherein the shared message scheduling circuitry comprises:
    a plurality of 32-bit registers including an output register electrically connected directly to at least the adder circuit of the first hashing circuitry and the adder circuit of the second hashing circuitry; and
    a shifting circuit constructed to shift a message word of a second register, of the plurality of 32-bit registers, to the output register,
    wherein the output register is constructed to store the first message word until the shifting circuit shifts the message word of the second register to the output register.

11. The cryptocurrency mining circuitry defined in claim 10, wherein the plurality of 32-bit registers includes sixteen registers.

12. The cryptocurrency mining circuitry defined in claim 10, wherein the shared message scheduling circuitry comprises at least one adder circuit and at least one logic circuit.

13. The cryptocurrency mining circuitry defined in claim 10, wherein at least one of the plurality of 32-bit registers is coupled to the control circuitry.

14. The cryptocurrency mining circuitry defined in claim 10,
    wherein an input of the output register is electrically connected to an output of the second register via a direct electrical connection,
    wherein an output of the output register is electrically connected to an input of the adder circuit of the first hashing circuitry via direct electrical connection,
    wherein the output of the output register is electrically connected to an input of the adder circuit of the second hashing circuitry via direct electrical connection.

15. The cryptocurrency mining circuitry defined in claim 14,
    the shared message scheduling circuitry further comprising: a logic circuit having an input electrically connected to an output of the second register via electrical connection, and an adder circuit having a first input electrically connected to the output of the output register via electrical connection, wherein an output of the logic circuit of the shared message scheduling circuitry is electrically connected to a second input of the adder circuit of the shared message scheduling circuitry.

16. The cryptocurrency mining circuitry defined in claim 1,
wherein an output of the shared message scheduling circuitry is electrically connected to an input of the adder circuit of the first hashing circuitry via direct electrical connection, and
wherein the output of the shared message scheduling circuitry is electrically connected to an input of the adder circuit of the second hashing circuitry via direct electrical connection.

\* \* \* \* \*